US012012223B2

(12) United States Patent
Lukaczyk et al.

(10) Patent No.: US 12,012,223 B2
(45) Date of Patent: Jun. 18, 2024

(54) LIGHTWEIGHT HIGH RESOLUTION CAMERA PAYLOAD FOR SMALL AERIAL VEHICLES

(71) Applicant: FLIGHTWAVE AEROSPACE SYSTEMS, Santa Monica, CA (US)

(72) Inventors: Trent Lukaczyk, Santa Monica, CA (US); Daniel Levy, Santa Monica, CA (US); Michael Colonno, Santa Monica, CA (US)

(73) Assignee: Flightwave Aerospace Systems, Santa Monica, CA (US)

( * ) Notice: Subject to any disclaimer, the term of this patent is extended or adjusted under 35 U.S.C. 154(b) by 148 days.

(21) Appl. No.: 17/738,102

(22) Filed: May 6, 2022

(65) Prior Publication Data

US 2022/0355951 A1 Nov. 10, 2022

Related U.S. Application Data

(60) Provisional application No. 63/185,578, filed on May 7, 2021.

(51) Int. Cl.
*B64D 47/08* (2006.01)
*B64C 39/02* (2023.01)
(Continued)

(52) U.S. Cl.
CPC ............ *B64D 47/08* (2013.01); *B64C 39/024* (2013.01); *G03B 17/55* (2013.01); *H04N 23/51* (2023.01); *B64U 2101/30* (2023.01)

(58) Field of Classification Search
CPC ............... B64U 2101/30; B64U 20/87; B64U 2101/31; B64D 47/08; H04N 23/50; G03B 17/55

See application file for complete search history.

(56) References Cited

U.S. PATENT DOCUMENTS

| 8,353,137 B2 * | 1/2013 | Boer | H04N 23/51 52/204.5 |
| 8,687,111 B2 * | 4/2014 | McKaughan | H04N 23/69 348/335 |

(Continued)

FOREIGN PATENT DOCUMENTS

| CN | 208746266 U | * | 4/2019 | ............. B64D 47/08 |
| WO | WO-2019127394 A1 | * | 7/2019 | ............... B64C 1/00 |

OTHER PUBLICATIONS

International Search Report for PCT/US2022/28045 (Year: 2022).*
International Preliminary Report on Patentability for PCT/US2022/28045 (Year: 2022).*

*Primary Examiner* — Leon W Rhodes, Jr.
(74) *Attorney, Agent, or Firm* — BakerHostetler

(57) ABSTRACT

A camera payload configured for attachment to an unmanned aerial system with a payload interface. The camera payload includes a payload interface that includes a configuration that is structured and arranged to provide tool-free mechanical retention, electrical connections for power, and electrical connections for data; at least one camera mounted in the camera payload; at least one composite skin and at least one internal structure; at least one sealable and removable camera window retained on an outside of the camera payload; and at least one computer arranged within the camera payload.

19 Claims, 28 Drawing Sheets

(51) Int. Cl.
*G03B 17/55* (2021.01)
*H04N 23/51* (2023.01)
*B64U 101/30* (2023.01)

(56) References Cited

U.S. PATENT DOCUMENTS

| | | | | |
|---|---|---|---|---|
| 10,513,325 | B2* | 12/2019 | Kooiman | B29C 70/545 |
| 10,795,242 | B2* | 10/2020 | Chan | G05D 1/02 |
| 11,447,248 | B2* | 9/2022 | Weekes | B64U 30/20 |
| 2021/0269172 | A1* | 9/2021 | Jung | H04N 23/57 |
| 2021/0300550 | A1* | 9/2021 | Owen | B64C 39/024 |

* cited by examiner

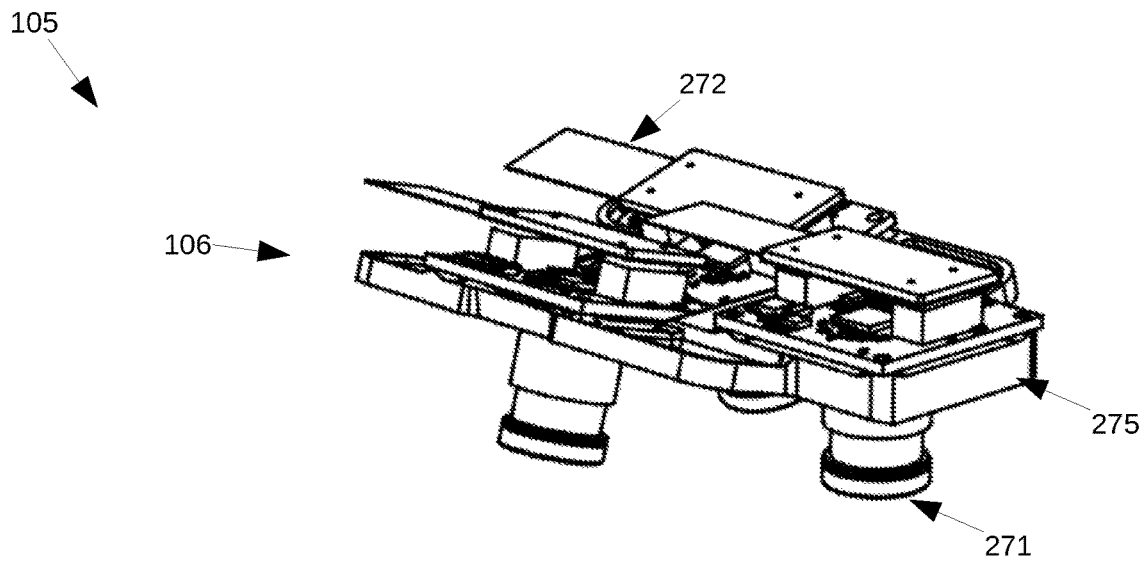
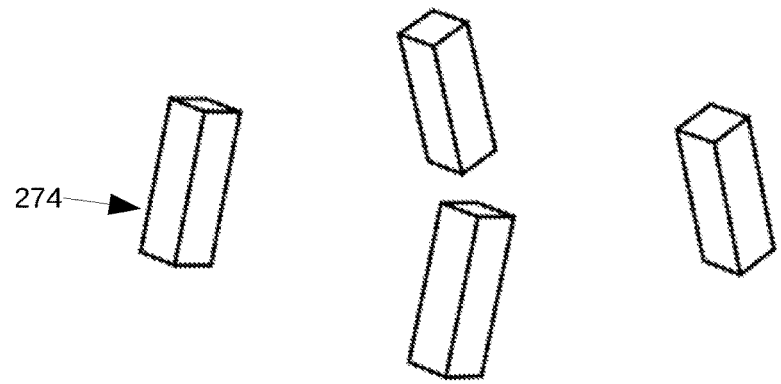
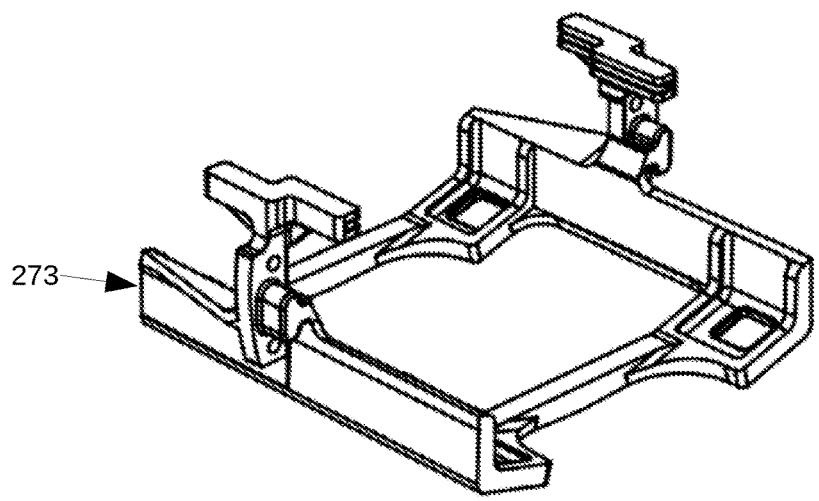
Fig. 21

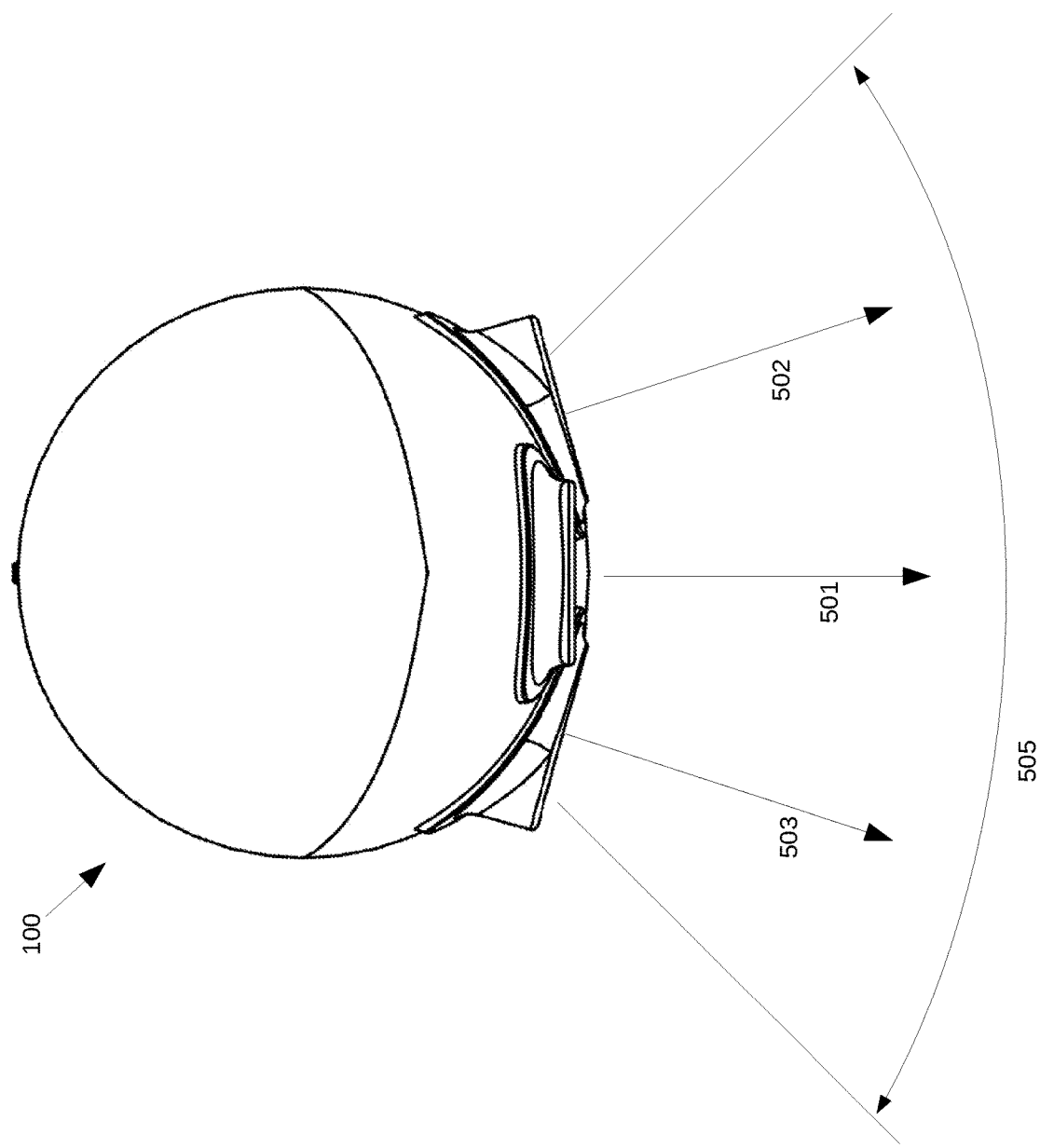

LIGHTWEIGHT HIGH RESOLUTION CAMERA PAYLOAD FOR SMALL AERIAL VEHICLES

CROSS-REFERENCE TO RELATED APPLICATIONS

This application claims the benefit of U.S. Provisional Application No. 63/185,578 filed on May 7, 2021, which is hereby incorporated by reference in its entirety for all purposes as if fully set forth herein.

The disclosure is directed to a lightweight high resolution camera payload for small aerial vehicles.

BACKGROUND OF THE DISCLOSURE

Sensors attached to UASs can be used to take high resolution images and those images can be compiled to make high resolution maps. In some cases those sensors may be too heavy for a UAS to fly, or the resolution of the images is not high enough for the application. Additionally, the UAS may vibrate the sensor and distort its data, leading to unusable results. Often, the integration of off the shelf cameras or sensors result in a heavy and difficult to use device, since extra materials intended to be held by human hands are ultimately not needed after being encased by an airframe skin. User oriented considerations also require the ability for the payload to be easily attached and removed from an airframe to allow it to be swapped for another payload with potentially very different capabilities.

Accordingly, a lightweight high resolution camera payload for small UASs capable of housing high resolution sensors that can capture undistorted data is needed.

SUMMARY OF THE DISCLOSURE

The foregoing needs are met, to a great extent, by the disclosure, wherein in one aspect a technique and apparatus are provided for a lightweight high resolution camera payload for small aerial vehicles.

One aspect includes a camera payload configured for attachment to an unmanned aerial system with a payload interface, the camera payload includes a payload interface includes a configuration that is structured and arranged to provide tool-free mechanical retention, electrical connections for power, and electrical connections for data; at least one camera mounted in the camera payload; at least one composite skin and at least one internal structure; at least one sealable and removable camera window retained on an outside of the camera payload; and at least one computer arranged within the camera payload, where excess heat generated by the at least one computer is disposed of through a heat transfer surface integrated into the composite skins of the camera payload.

One aspect includes a process of implementing a camera payload configured for attachment to an unmanned aerial system with a payload interface, the process of implementing a camera payload includes configuring and arranging a payload interface to provide tool-free mechanical retention, electrical connections for power, and electrical connections for data; providing at least one camera mounted in the camera payload; implementing at least one composite skin and at least one internal structure; implementing at least one sealable and removable camera window retained on an outside of the camera payload; and implementing at least one computer arranged within the camera payload, where excess heat generated by the at least one computer is disposed of through a heat transfer surface integrated into the composite skins of the camera payload.

One aspect includes a method of constructing a lightweight camera payload configured for attachment to an unmanned aerial system with a payload interface that that includes: providing a configuration that is structured and arranged to provide: tool-free mechanical retention; electrical connections for power; and electrical connections for data; mounting one, two, three, or more cameras in the payload; constructing using composite skins and internal structure; providing sealable and removable camera windows retained on the outside of the payload; and providing at least one computer, where excess heat generated by one or more of the computers is disposed of through a heat transfer surface integrated into the skin of the payload.

One aspect includes a lightweight camera payload configured for attachment to an unmanned aerial system with a payload interface that that includes: a configuration that is structured and arranged to provide: tool-free mechanical retention; electrical connections for power; and electrical connections for data; one, two, three, or more cameras mounted in the payload; a construction using composite skins and internal structure; sealable and removable camera windows retained on the outside of the payload; and at least one computer, where excess heat generated by one or more of the computers is disposed of through a heat transfer surface integrated into the skin of the payload.

There has thus been outlined, rather broadly, certain aspects of the disclosure in order that the detailed description thereof herein may be better understood, and in order that the present contribution to the art may be better appreciated. There are, of course, additional aspects of the disclosure that will be described below and which will form the subject matter of the claims appended hereto.

In this respect, before explaining at least one aspect of the disclosure in detail, it is to be understood that the disclosure is not limited in its application to the details of construction and to the arrangements of the components set forth in the following description or illustrated in the drawings. The disclosure is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the disclosure. It is important, therefore, that the claims be regarded as including such equivalent constructions insofar as they do not depart from the spirit and scope of the disclosure.

BRIEF DESCRIPTION OF THE DRAWINGS

FIG. 21 illustrates a camera payload according to FIG. 1.
FIG. 28 illustrates a camera payload according to the disclosure.

DETAILED DESCRIPTION

Figure 1:
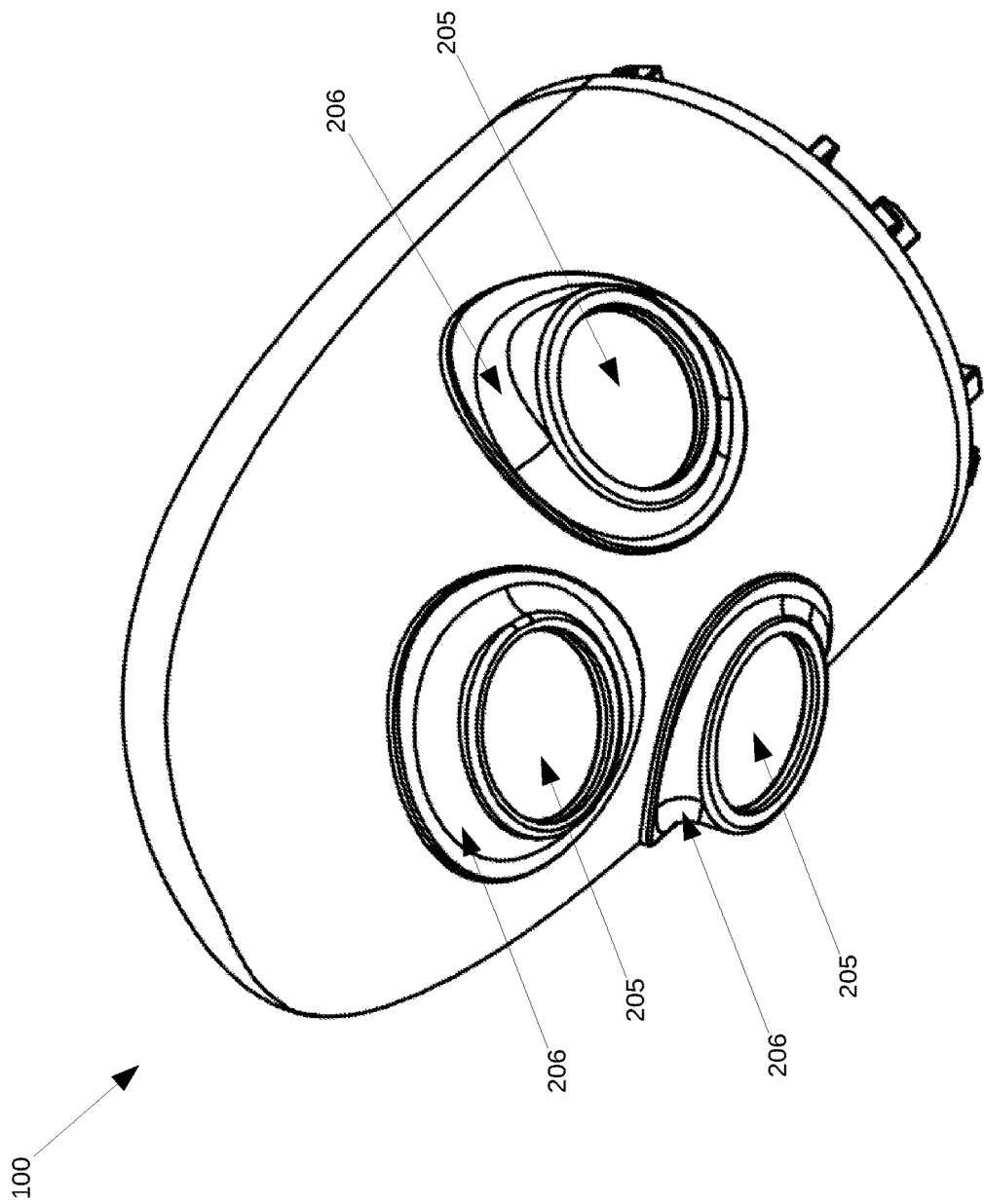
FIG. 1 illustrates a camera payload according to the disclosure.
Figure 2:
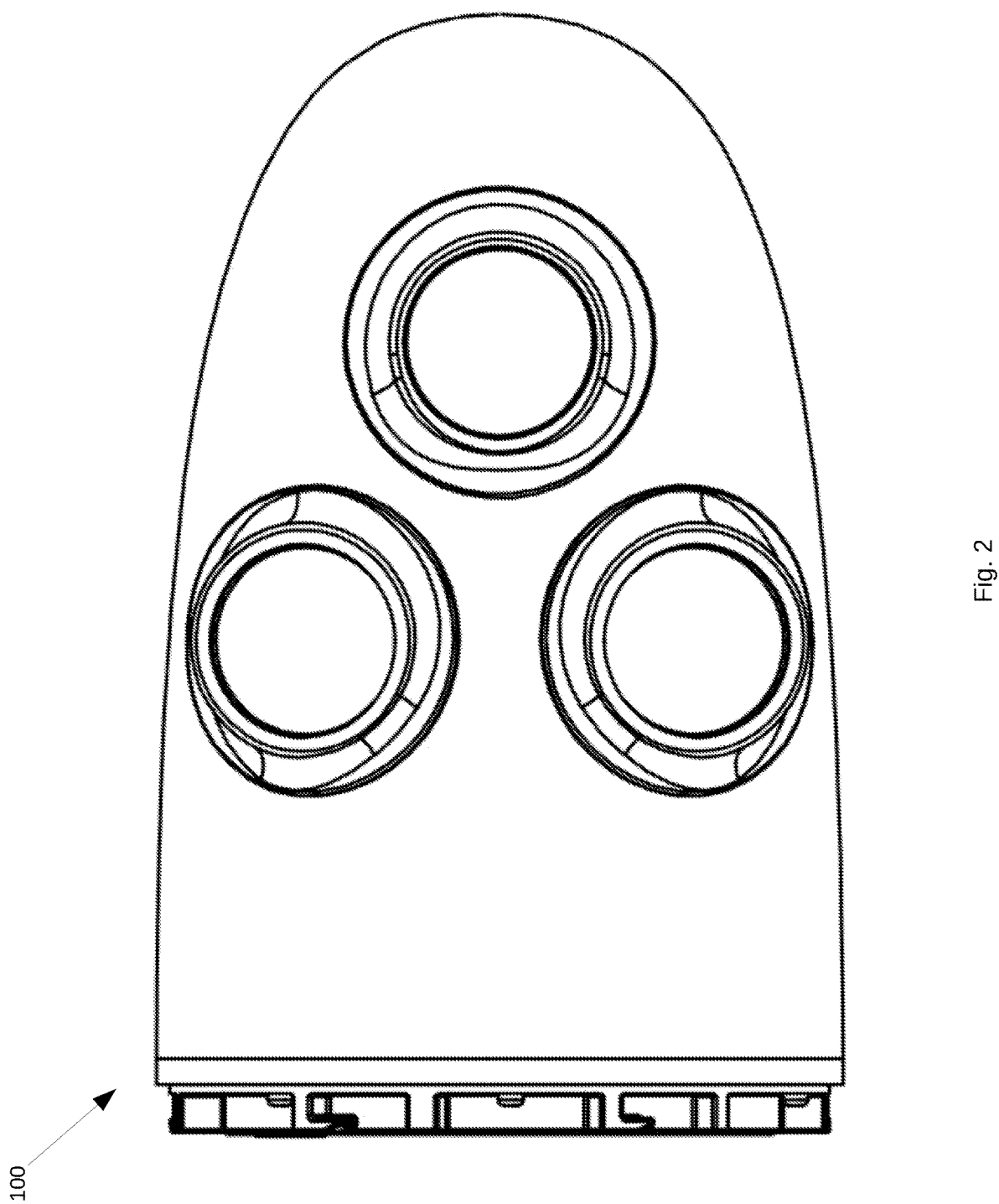
FIG. 2 illustrates a camera payload according to FIG. 1.
Figure 3:
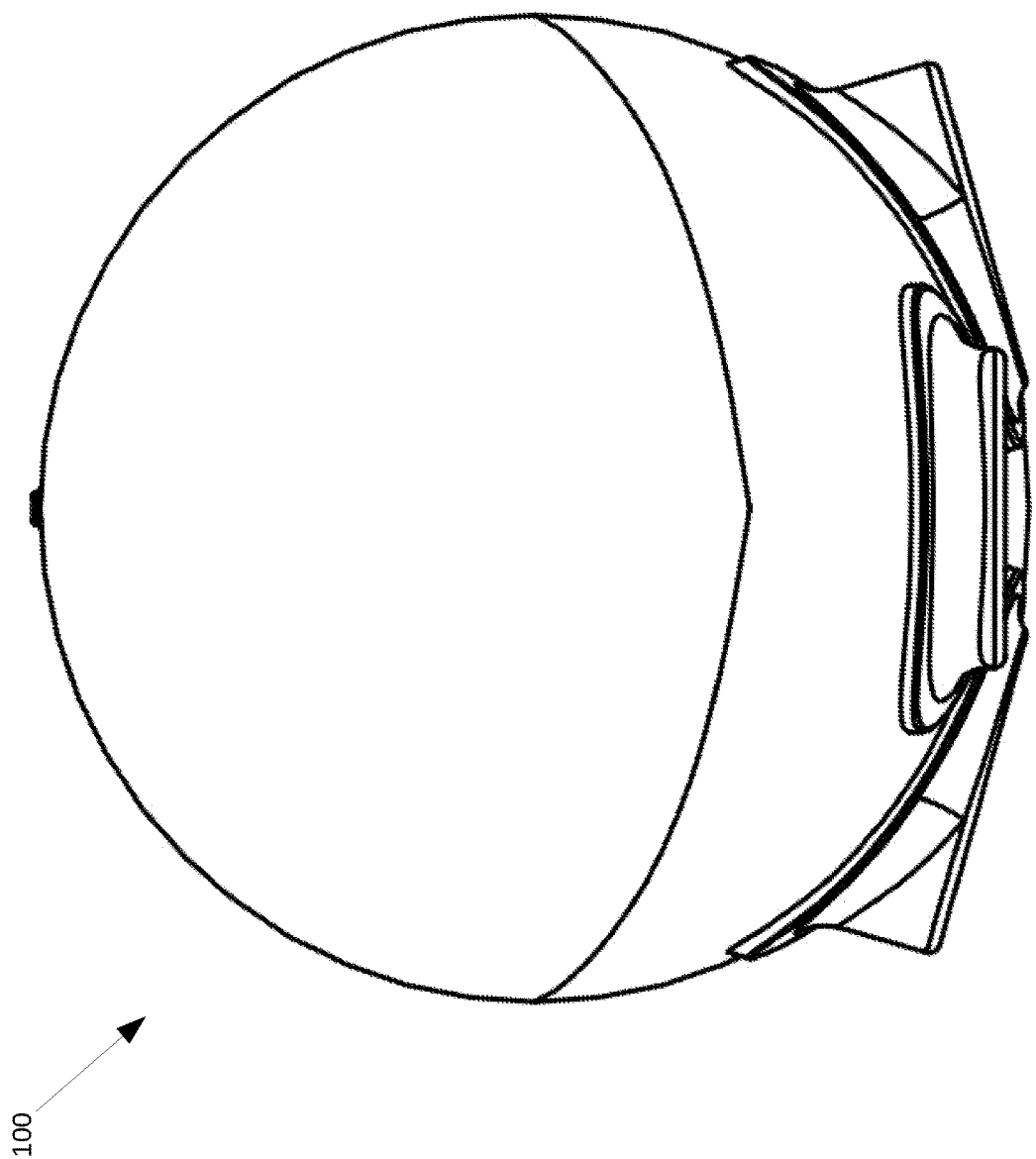
FIG. 3 illustrates a camera payload according to FIG. 1.
Figure 4:
FIG. 4 illustrates a camera payload according to FIG. 1.

The disclosure will now be described with reference to the drawing figures, in which like reference numerals refer to like parts throughout.

System Level Description

This disclosure relates to high resolution image capturing devices used on an Unmanned Aircraft Systems (UAS). More particularly the disclosure relates to the use of image capture for the purpose of generating a map, a high resolution composite image, and/or the like.

The disclosed device may be configured as a payload for Unmanned Aircraft Systems (UAS) and/or an aircraft. The payload may include a single camera array or a multi-camera array (camera), onboard computer, and a memory card housed inside of a shell of the payload with one or more watertight window seals. The camera may or may not be vibration isolated to reduce rolling shutter artifacts in an image generated by the camera. The onboard computer may be configured to reject heat through a skin of the shell. By using multiple cameras, more image data may be collected from each flight.

Overall Payload Construction

Figure 5:
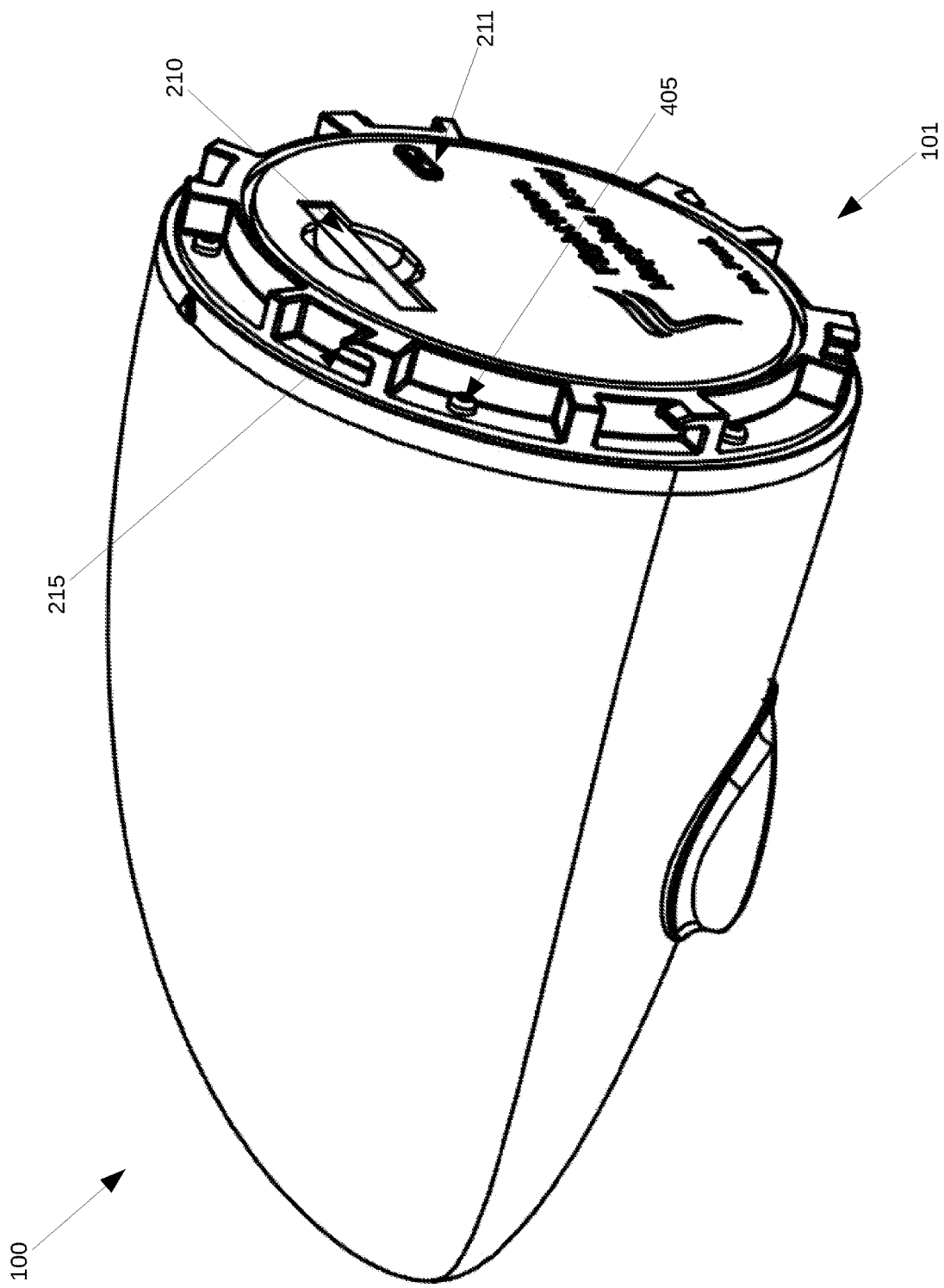
FIG. 5 illustrates a camera payload according to FIG. 1.

As illustrated in FIG. 1, FIG. 2, FIG. 3, FIG. 4, and FIG. 5, the outside of a payload 100 may be a nose cone with one or more windows 205 held by window holder 206. In particular, as illustrated in FIG. 5, the payload 100 may include a payload wall 101 at a back of the payload 100 that may provide sealing of the payload 100 from the environment (water, dust). In aspects, the payload wall 101 of the payload 100 may provide sealing of the payload 100 in conjunction with a connection to the UAS 1010 and/or the aircraft.

In aspects, the payload wall 101 of the payload 100 may include mechanical retention hooks 215. The mechanical retention hooks 215 may be configured to provide to a tool-free interface for joining the payload 100 to the UAS 1010 and/or the aircraft. Additionally, the payload wall 101 of the payload 100 may include a payload connector 211. The payload connector 211 may be configured for power transfer and/or data transfer between the payload 100 and the UAS 1010. Further, the payload 100 may include a removable data storage card 210 to access mission data at the end of a flight. In aspects, the removable data storage card 210 may be accessed through a slot in the payload wall 101.

Figure 6:
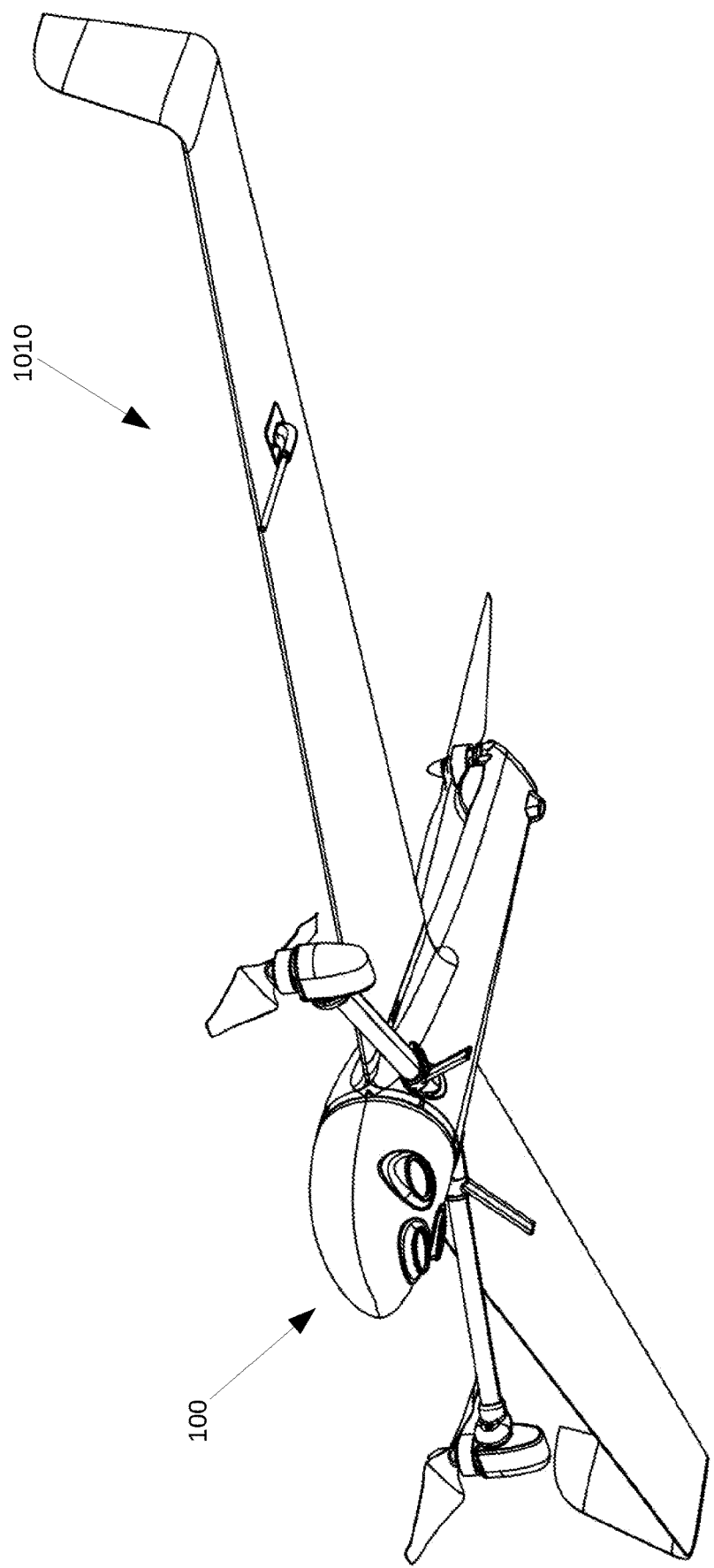
FIG. 6 illustrates an aircraft and a camera payload according to FIG. 1.
Figure 7:
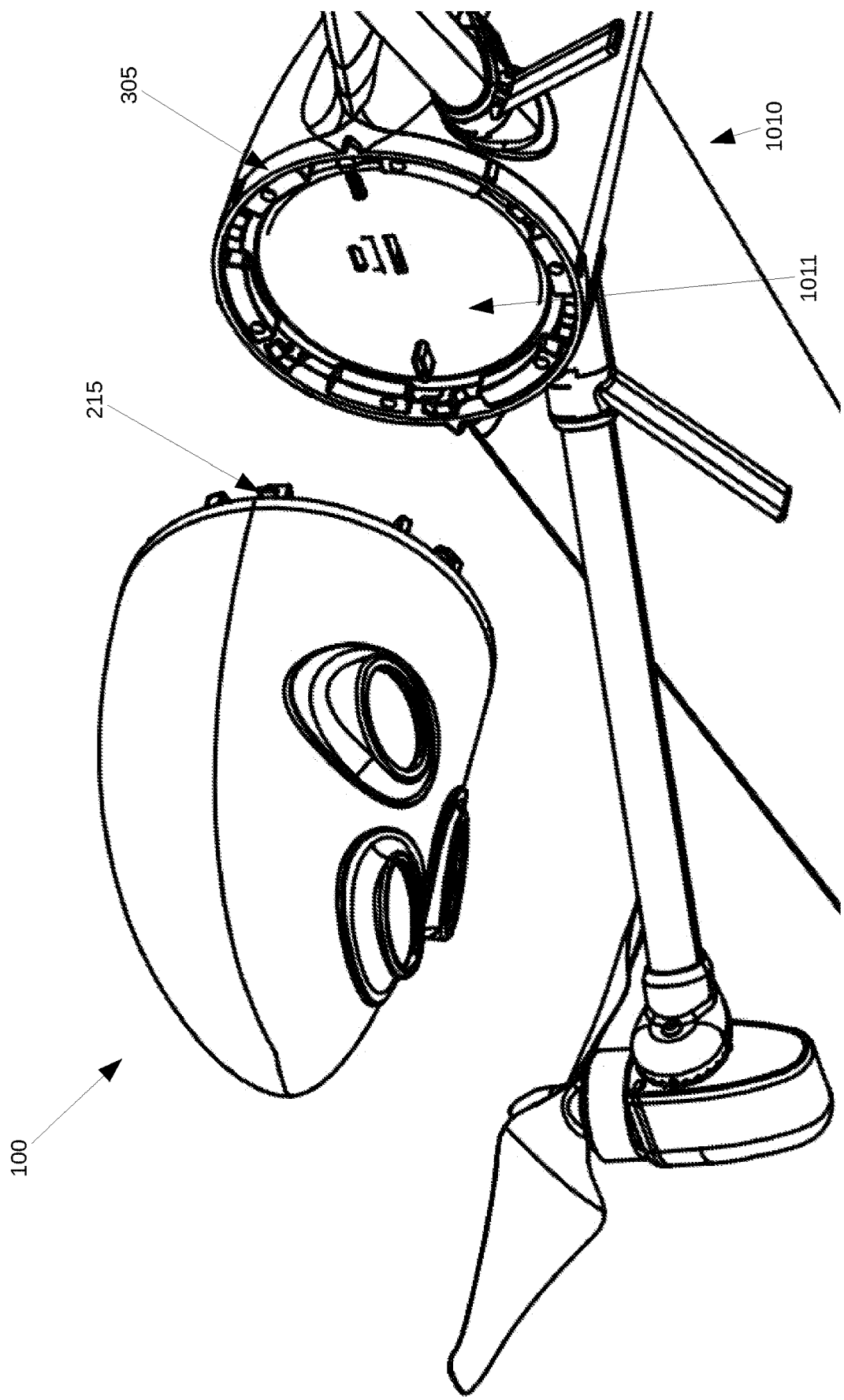
FIG. 7 illustrates an aircraft and a camera payload according to FIG. 6.

As shown in FIG. 6 and FIG. 7, the payload 100 may be configured to attach on and/or to an UAS 1010. In aspects, the payload 100 may be configured to attach on the UAS 1010 using a payload interface 1011 as illustrated in FIG. 7. The payload interface 1011 may include a latch ring 305, which may be configured to interface with the mechanical retention hooks 215 of the payload 100.

The mechanical retention hooks 215 may include portions extending from the payload wall 101 of the payload 100 as illustrated in FIG. 5 that are configured to engage corresponding features of the latch ring 305 of the payload interface 1011 of the UAS 1010 as illustrated in FIG. 7. In this regard, the payload wall 101 of the payload 100 may be extended into the latch ring 305 of the UAS 1010 such that the mechanical retention hooks 215 on the payload wall 101 may be inserted into corresponding features of the latch ring 305 of the payload interface 1011 of the UAS 1010. Thereafter, rotation of the payload 100 may position the mechanical retention hooks 215 into a locked mechanical configuration with the corresponding portions of the latch ring 305 of the payload interface 1011 of the UAS 1010. The mechanical retention hooks 215 may include arms that flex together with end portions with hooks. During rotation of the payload 100, the arms of the mechanical retention hooks 215 may flex such that the hook portions of the mechanical retention hooks 215 engage the corresponding portions of the latch ring 305 of payload interface 1011 of the UAS 1010.

In this regard, the mechanical retention hooks 215 of the payload 100 may provide a tool free mechanism to attach the payload 100 to the UAS 1010. More specifically, no tools are required to insert the mechanical retention hooks 215 of the payload 100 into the latch ring 305 of the UAS 1010. Moreover, no tools are required to rotate the payload 100 with respect to the UAS 1010 to engage the mechanical retention hooks 215 with the latch ring 305. More specifically, the mechanical retention hooks 215 are implemented without mechanical fasteners requiring tools to tighten or loosen the same. Attachment of the payload 100 by the mechanical retention hooks 215 engaging the latch ring 305 may be configured for hand rotation of the payload 100 with respect to the UAS 1010 for attachment of the payload 100 to the UAS 1010.

In aspects, the payload 100 may include a nose cone structure 104. The nose cone structure 104 may have a shape with low aerodynamic drag, a low coefficient of drag, and/or the like. In particular, the nose cone structure 104 of the payload 100 may have a nose portion curving to a terminal end that may form a front tip or front portion of the payload 100 as well as a front tip or front portion of the UAS 1010 once the payload 100 and the nose cone structure 104 are attached to the UAS 1010.

Figure 8:
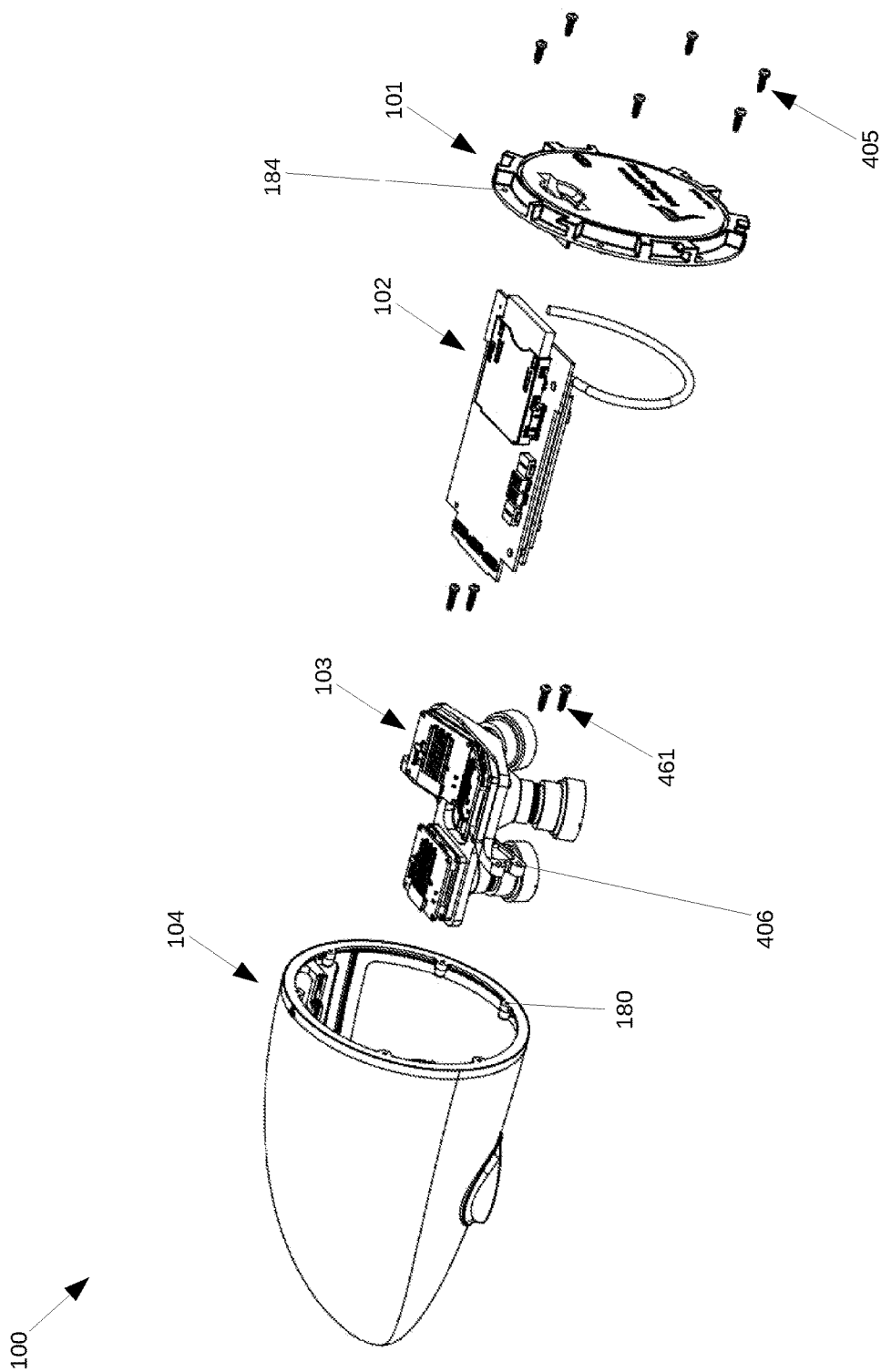
FIG. 8 illustrates a camera payload according to FIG. 1.

In aspects, internal portions of the payload 100 may be modular as shown in FIG. 8. In this regard, the payload wall 101 may be held onto a nose cone structure 104 via mechanical fasteners 405, such as screws. The mechanical fasteners 405 may extend through the payload wall 101 and engage with the nose cone structure 104 of the payload 100. In aspects, the mechanical fasteners 405 may extend through apertures 184 arranged in the payload wall 101. In particular, portions of the nose cone structure 104 may include apertures 180 for receiving end portions of the mechanical fasteners 405 configured for mechanical attachment of the payload wall 101 to the nose cone structure 104. The end portions of the mechanical fasteners 405 may include threaded portions.

Within the payload wall 101 of the payload 100 may be at least one computer module 102. Additionally, within the nose cone structure 104 of the payload 100 may be a sensor module assembly 103. In aspects, the sensor module assembly 103 may be installed into the payload 100 and/or the nose cone structure 104 via fasteners 461, such as fastening screws. The fasteners 461 may extend partially through the sensor module assembly 103 and engage the nose cone structure 104 of the payload 100. In aspects, the sensor module assembly 103 may include mounting holes 406 for receiving the fasteners 461 and the fasteners 461 may fasten to an internal structure of the nose cone structure 104.

Payload Wall Assembly

Figure 9:
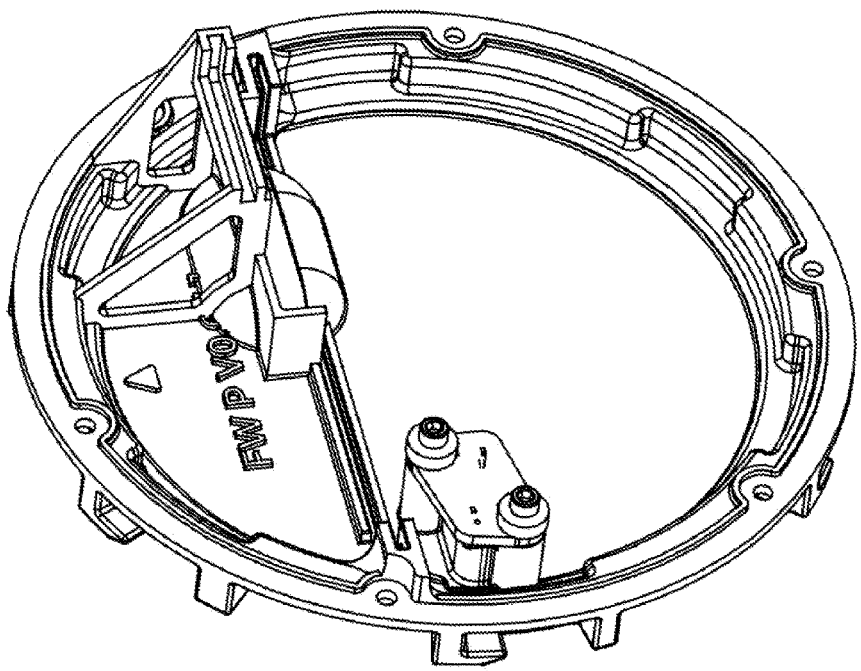
FIG. 9 illustrates a camera payload according to FIG. 1.
Figure 10:
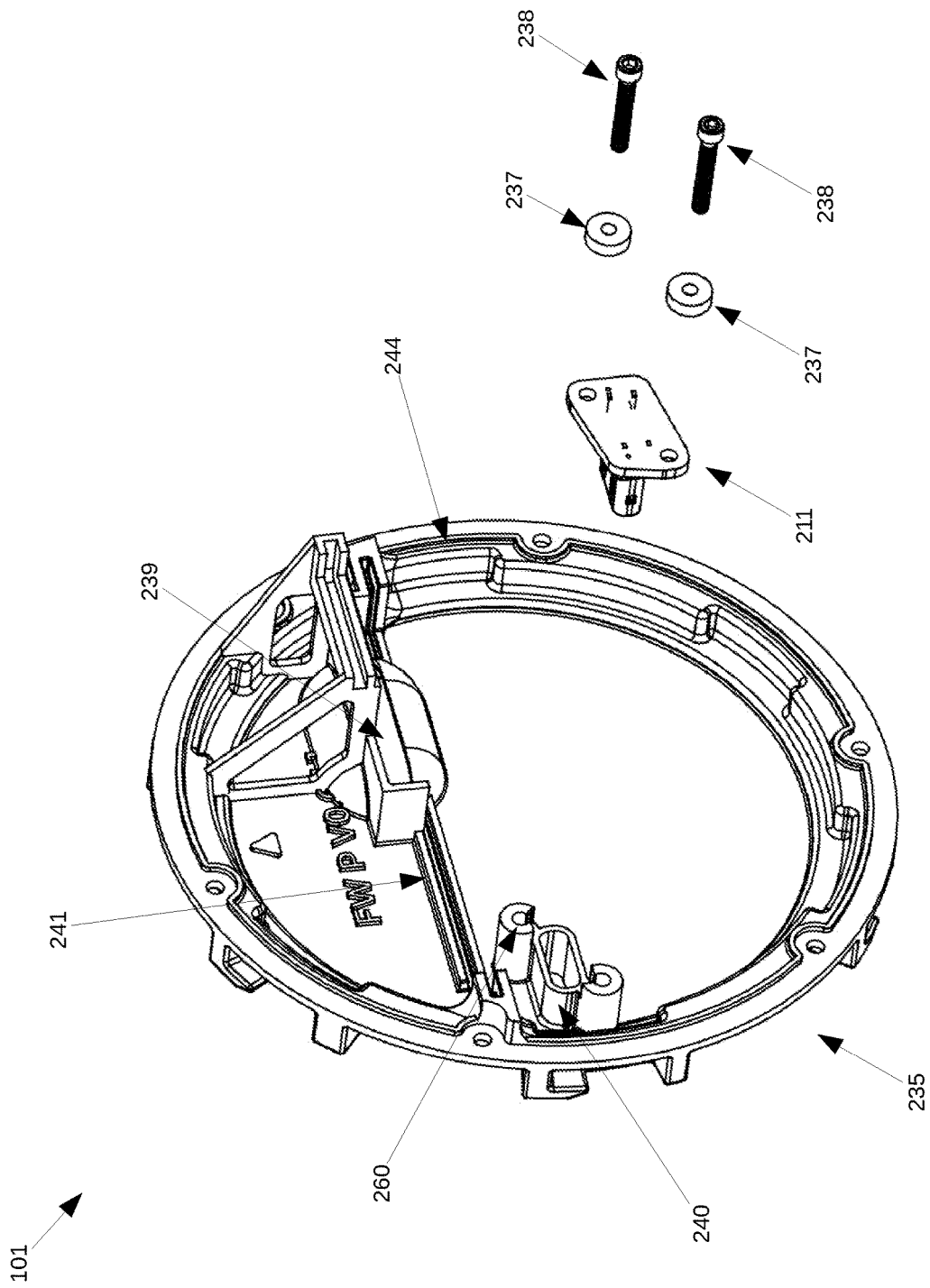
FIG. 10 illustrates a camera payload according to FIG. 1.
Figure 11:
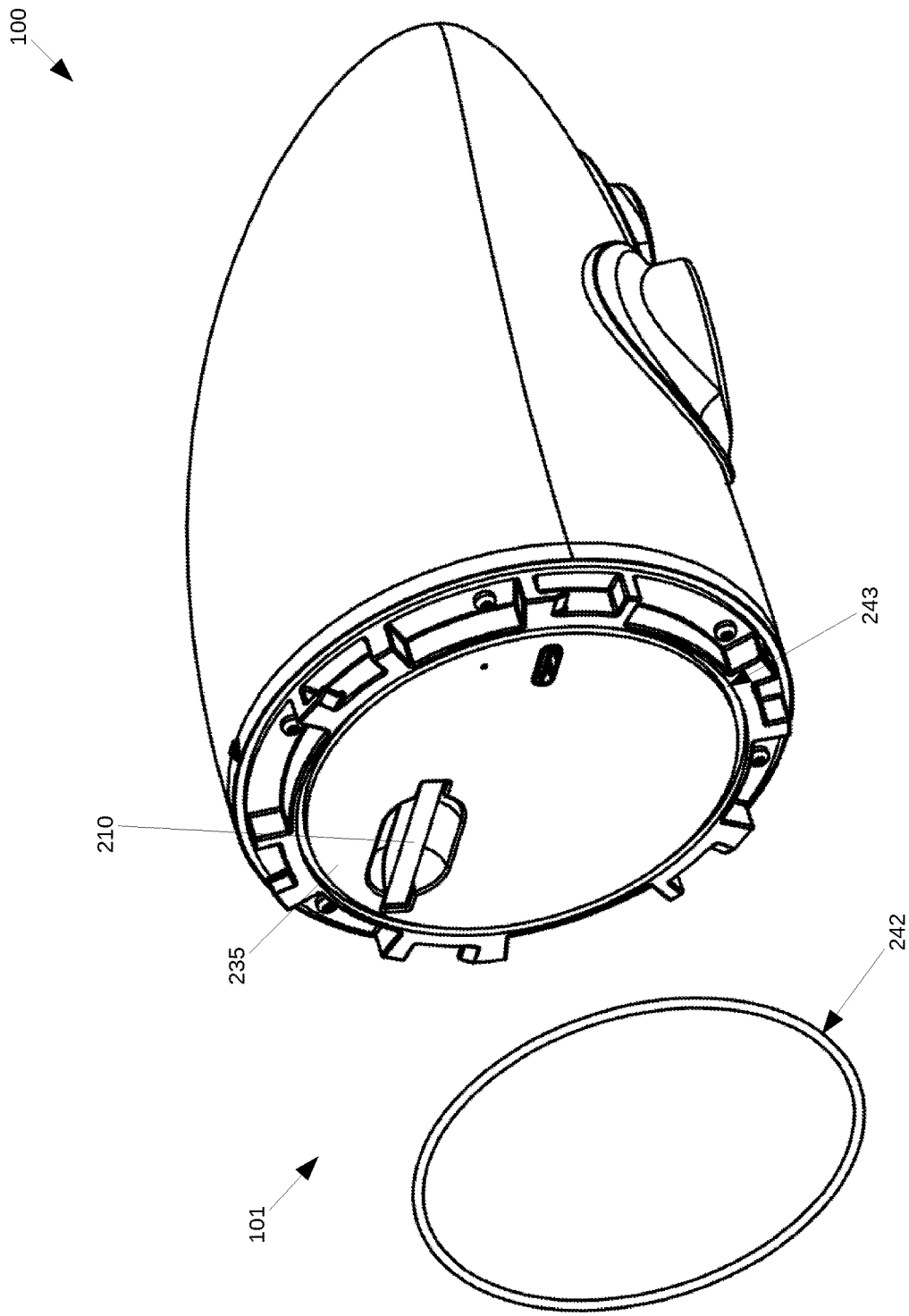
FIG. 11 illustrates a camera payload according to FIG. 1.

The assembling of the payload wall 101 is further illustrated in FIG. 9, FIG. 10, and FIG. 11. The payload wall 101 may include a payload wall structure 235 as illustrated in FIG. 10. In aspects, the payload wall structure 235 may be configured to carry and/or support the payload connector 211. Additionally, the payload wall structure 235 may include a guiding feature 240. The guiding feature 240 may surround a portion of the payload connector 211 and provide mechanical support for the payload connector 211 within the payload wall 101 of the payload 100.

The payload connector 211 may be retained using mechanical fasteners 238, such as screws. The mechanical fasteners 238 may be inserted through the payload connector 211 and engage the payload wall structure 235. In particular, the mechanical fasteners 238 may engage apertures 260 located adjacent the guiding feature 240. The apertures 260 may be formed by structures that are part of the payload wall structure 235. Additionally, the mechanical fasteners 238 may be further configured to be spring-loaded using a compliant buffer 237. The combination of the mechanical fasteners 238 and the compliant buffer 237 may be configured to enable a more robust connection of the payload connector 211 of the payload wall structure 235 to the payload 100, the nose cone structure 104, the UAS 1010, and/or the like.

Additionally, the payload wall structure 235 may be configured to form an opening 239. The opening 239 may be configured to access the removable data storage card 210. The payload wall 101 may house the removable data storage card 210 that may be configured to be accessed by the user when the payload 100 is not connected to the UAS 1010. In this regard, removal of the payload 100 from the UAS 1010 may allow a user to gain access to the opening 239 and/or removable data storage card 210. In aspects, the removable data storage card 210 may be connected the at least one computer module 102. In aspects, the removable data storage card 210 may be implemented utilizing a CFexpress standard for removable media cards implementing a PCIe 3.0 interface. In aspects, the removable data storage card 210 may be implemented utilizing a microSD removable miniaturized Secure Digital flash memory card. In aspects, the removable data storage card 210 may be implemented utilizing a secure Digital (SD) Memory Card.

Additionally, the payload wall structure 235 may include detailed holding structures 241 configured to help carry the at least one computer module 102. In this regard, the detailed holding structures 241 may engage a portion of the at least one computer module 102 and support the at least one computer module 102 thereon within the nose cone structure 104.

With reference to FIG. 11, the payload wall 101 of the payload 100 may include a sealing O-ring 242. The sealing O-ring 242 may be configured to be installed in an O-ring groove 243 within payload wall structure 235 of the payload wall 101. In aspects, the O-ring groove 243 and the sealing O-ring 242 may be configured with sealing features that seal the payload wall 101 of the payload 100 from contaminants, such as water, dust, etc. In particular, the O-ring groove 243 and the sealing O-ring 242 may be configured with sealing features that seal the payload wall 101 of the payload 100 from contaminants when the payload 100 is attached to the aircraft.

Referring back to FIG. 10, the payload wall structure 235 of the payload 100 may include alignment walls 244. The alignment walls 244 may be configured to assist with assembly of the payload wall structure 235 and associated components into the nose cone structure 104. In this regard, the alignment walls 244 can be provided for by the payload wall structure 235. In aspects, the alignment walls 244 may engage a portion of an internal structure of the nose cone structure 104.

Internal Payload Structure

Figure 12:
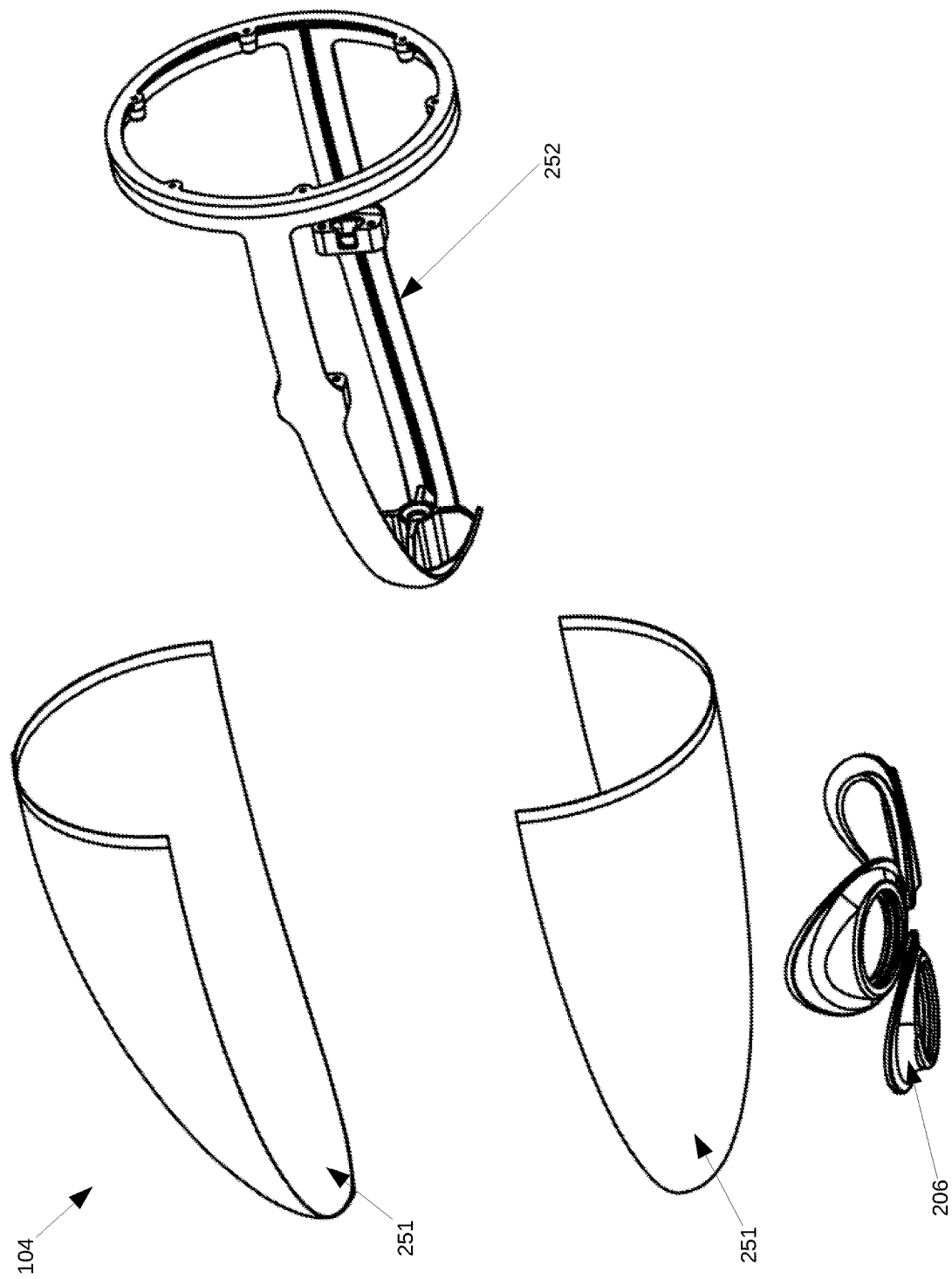
FIG. 12 illustrates a camera payload according to FIG. 1.

As illustrated in FIG. 12, the nose cone structure 104 may be assembled as a bonded composite structure, which may include one or more composite skins 251. As illustrated in FIG. 12, the one or more composite skins 251 may be configured as two halve portions of the nose cone structure 104. In aspects, the one or more composite skins 251 may include a top skin portion of the composite skin 251 and a bottom skin of the composite skin 251. Additionally, the nose cone structure 104 of the payload 100 may include an internal structure 252. The one or more composite skins 251 may be configured to be adhered to the internal structure 252 using a suitable adhesive. Additional exterior structures of the nose cone structure 104 and/or the payload 100 may be bonded to an outside surface of the one or more composite skins 251. For example, the window holders 206 may be bonded to the outside surface of the one or more composite skins 251. This construction method of the nose cone structure 104 may be beneficial to providing the payload 100 with a very low weight, which is beneficial for high performance UAS.

The one or more composite skins 251 may allow for a rigid waterproof and/or water resistant structure while keeping the structure lightweight. The material used in the one or more composite skins 251 may also allow for heat dissipation through the skin into the open air. The one or more composite skins 251 may include bonded fabric, a metal, a synthetic material, and/or the like. When implemented according to the method of the disclosure and other aspects of the disclosure, the result provides a lightweight design. In particular a large fraction (over 70%) of the payload's mass can be dedicated to sensors and computers. In aspects of the disclosure, the payload may be implemented as a lightweight payload. In aspects of the disclosure, a lightweight payload is defined as a payload having a mass less than 100 pounds, less than 50 pounds, less than 25 pounds, less than 15 pounds, less than 10 pounds, less than 5 pounds and/or less than 1 pound. Additionally, in aspects of the disclosure, a lightweight payload is defined as a payload having a mass of 0.5-1 pounds, 1-5 pounds, 5 pounds-100 pounds, 5 pounds-10 pounds, 10 pounds-15 pounds, 15 pounds-25 pounds, or 25 pounds-50 pounds. In aspects of the disclosure, the UAS may be implemented as a lightweight UAS. In aspects of the disclosure, a lightweight UAS is defined as a UAS having a mass less than 400 pounds, less than 300 pounds, less than 200 pounds, less than 100 pounds, less than 50 pounds, less than 25 pounds, less than 10 pounds, and/or less than 5 pounds. Additionally, in aspects of the disclosure a lightweight UAS is defined as a UAS having a mass of 5 pounds-50 pounds, 25 pounds-400 pounds, 25 pounds-100 pounds, 100 pounds-200 pounds, 200 pounds-300 pounds, or 300 pounds-400 pounds.

The bonded composite structure may include an adhesive. In aspects, a fabrication attach process may utilize an adhesive to form a connection between the composite skin 251 and the internal structure 252. In particular, the fabrication attach process may utilize an adhesive bonding process that may include applying a layer to connect surfaces of the composite skin 251 and the internal structure 252. The adhesive may be organic or inorganic; and the adhesive may be deposited on one or more surfaces. The adhesive may be utilized in an adhesive bonding process that may include applying adhesive material with a particular coating thickness, at a particular bonding temperature, for a particular processing time while in an environment that may include applying a particular tool pressure. The internal structure 252 may be composed of a plastic, or any similar material. As for the bond, it can be composed of an epoxy with or without an epoxy thickener, or any other type of glue compatible with the materials it is bonding to. The composite skins 251 may be a single layer fiberglass or multiple layers of fiberglass or carbon fiber sheets of an array of weights, weaves, and orientations. Additionally, the composite skins 251 may or may not include a core made from an array of materials that can include foam, Kevlar, aluminum, and/or the like.

Computer Module

Figure 13:
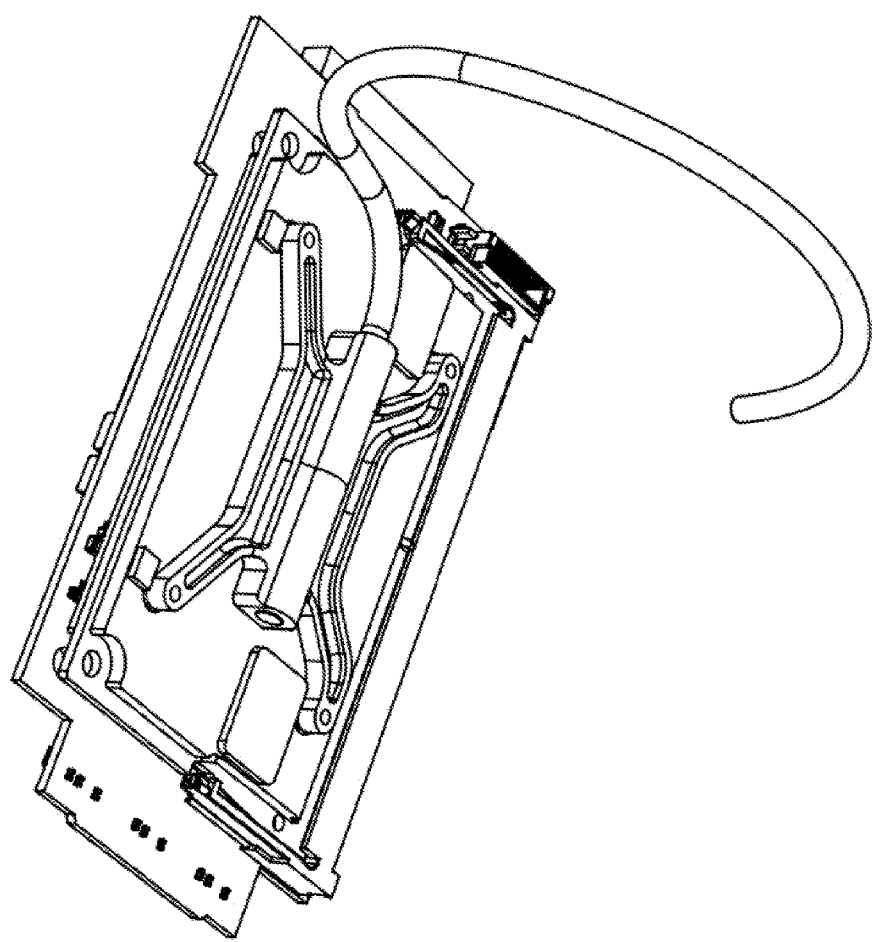
FIG. 13 illustrates a camera payload according to FIG. 1.
Figure 14:
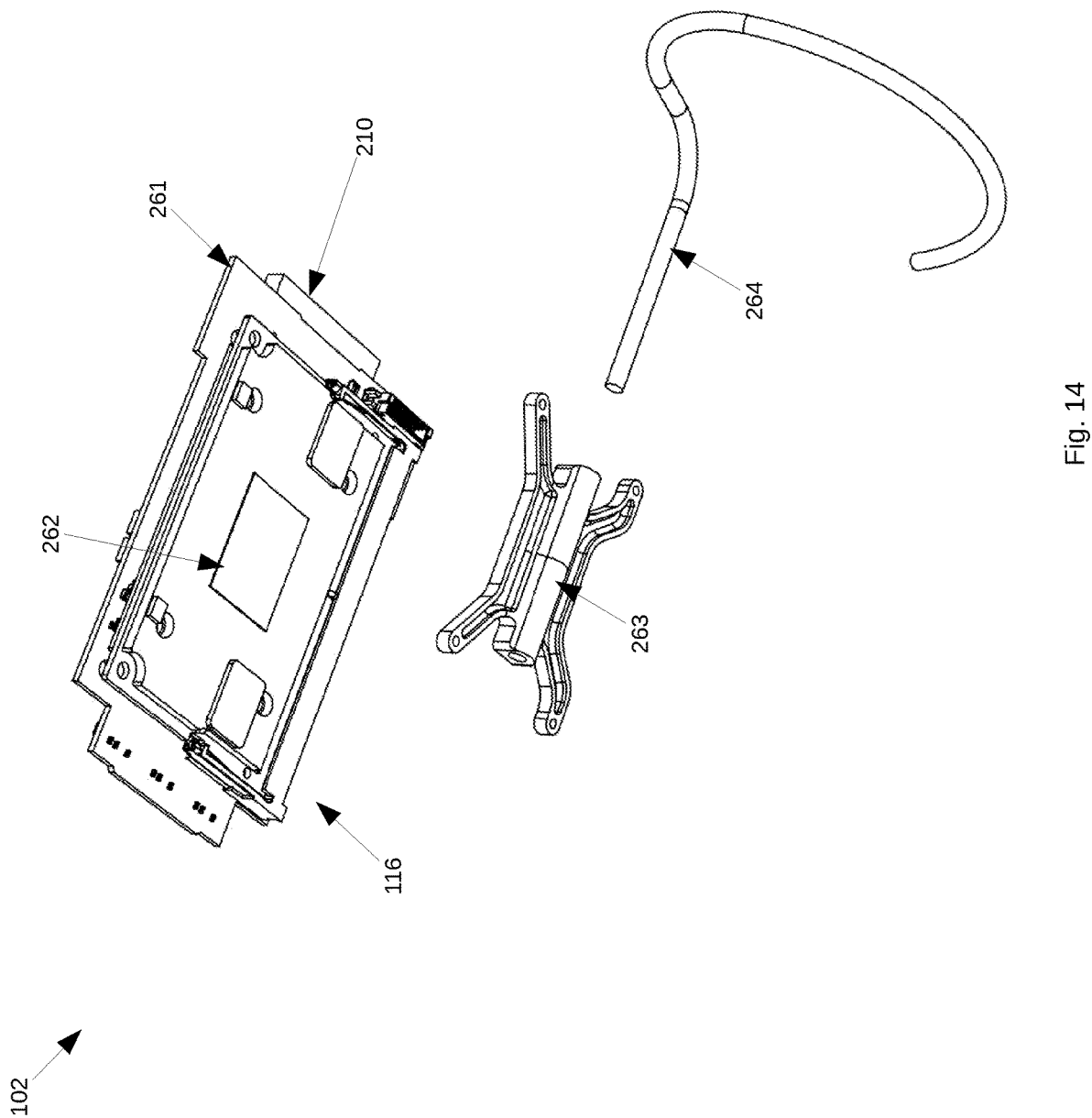
FIG. 14 illustrates a camera payload according to FIG. 1.

The assembly of the at least one computer module 102 is shown in FIG. 13 and FIG. 14. The at least one computer module 102 may include a processing assembly 116 as illustrated in FIG. 14. The processing assembly 116 may include a carrying circuit board 261 on which mounts a processing module 262. The carrying circuit board 261 may be implemented as a substrate, a printed circuit board, a heat sink, and/or the like. Additionally, the at least one computer module 102 may be configured with a socket that is arranged on the at least one computer module 102 in order to expose the socket to receive the removable data storage card 210 through the payload wall 101 of the payload 100.

In aspects, the at least one computer module 102 may also provide interfaces to connect to sensors, for example in the case when imaging sensors are a part of the payload 100. The at least one computer module 102 may be configured to be available to the payload 100 to run software needed for the collection of data from the sensors, analysis of the data from the sensors in real time using any number of algorithms including computer vision and machine learning algorithms, transmission of the data in real time either directly from within the payload 100 or indirectly through the help of networks and radios made available by the UAS 1010 through the payload connector 211, and/or storing the data to removable data storage devices, such as removable data storage card 210, or internally within on board storage of the at least one computer module 102.

Heat Rejection

Moving heat generated by a high powered computer, such as the processing module 262 of the at least one computer module 102, to the outside air is a vital and challenging issue. In aspects, without heat rejection, the at least one computer module 102 and/or the processing module 262 may fail to operate in most practical conditions. FIG. 13 and FIG. 14 illustrates how the at least one computer module 102 may be configured with a heat transfer bracket 263. In aspects, the heat transfer bracket 263 may be configured to remove heat from processing die and/or the like of the processing module 262 and/or the at least one computer module 102. In aspects, the heat transfer bracket 263 may be a metallic structure in thermal communication with the processing module 262, the at least one computer module 102, and/or the like.

Additionally, the payload 100 may include a heat pipe 264. The heat transfer bracket 263 may be configured to join and/or thermally connect to the heat pipe 264. In aspects, the heat pipe 264 may be configured with suitable heat transfer properties to transport heat from the at least one computer module 102, the processing module 262, the heat transfer bracket 263, and/or the like along an outer ring of the heat pipe 264.

Figure 15:
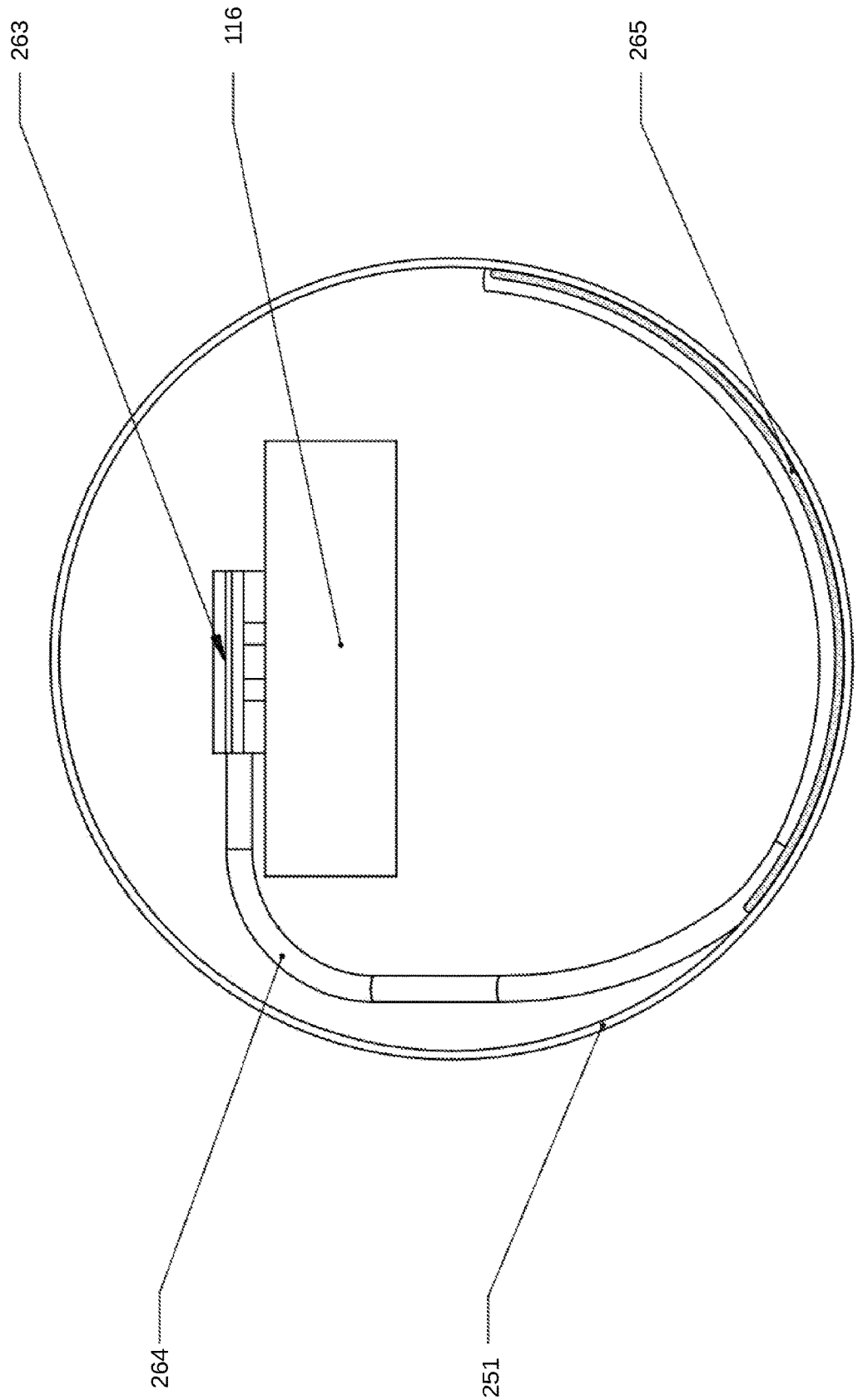
FIG. 15 illustrates a camera payload according to FIG. 1.

FIG. 15 illustrates how the heat can be further removed from the heat pipe 264. In the presented embodiment, the heat pipe 264 may be thermally bonded to the composite skin 251. The composite skin 251 may be constructed to include a heat-wicking material. The heat-wicking material may distribute the heat from the heat pipe 264 along the skin of the payload 100 more efficiently and may increase and efficacy of the composite skin 251 in dissipating the heat from the payload 100, the at least one computer module 102, the processing module 262, and/or the like to the outside air. All various joints between heat transferring materials, such as the heat pipe 264 and the heat transfer bracket 263, may be filled with a thermal transfer compound to improve heat transfer efficiency. For example, as shown in FIG. 15, a transfer compound 265 may be configured and installed between the heat pipe 264 and an outer skin of the payload 100, such as the composite skin 251.

Data Retrieval

Figure 16:
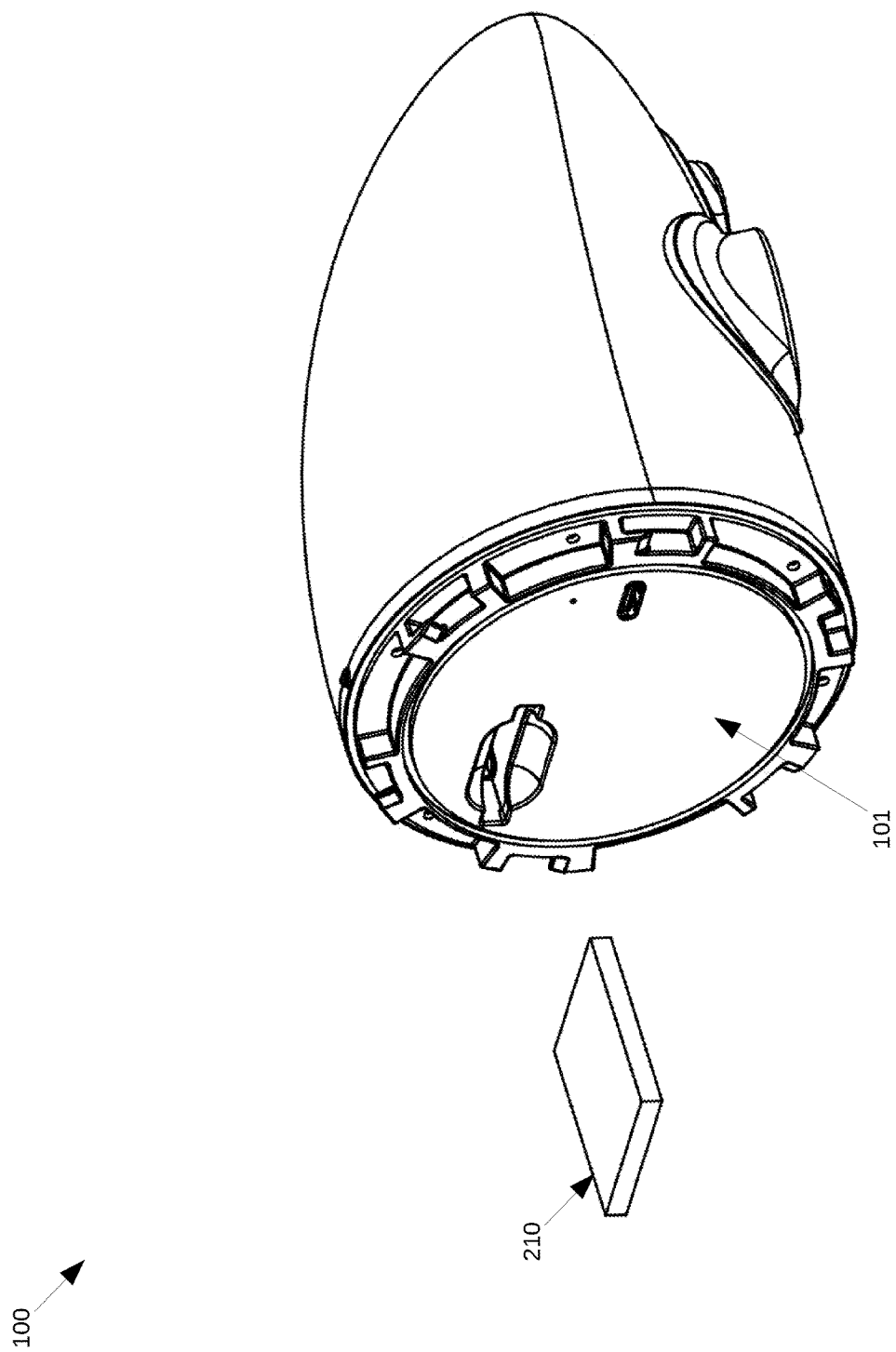
FIG. 16 illustrates a camera payload according to FIG. 1.

As illustrated in FIG. 16, the removable data storage card 210 may be configured to store large amounts of data. In aspects, the removable data storage card 210 may be implemented utilizing a CFexpress standard for removable media cards implementing a PCIe 3.0 interface. In aspects, the removable data storage card 210 may be implemented utilizing a microSD removable miniaturized Secure Digital flash memory card. In aspects, the removable data storage card 210 may be implemented utilizing a secure Digital (SD) Memory Card.

In aspects, the removable data storage card 210 may be configured to be accessible from the payload wall 101 as illustrated in FIG. 16. In this regard, implementation of the payload 100 is configured such that the payload wall 101 and/or the removable data storage card 210 may be configured to be protected from the environment when the payload 100 is attached to the UAS 1010. Any number of data types may be stored to the removable data storage card 210, such as Joint Photographic Experts Group (jpeg) image files, Graphics Interchange Format (gif) image files, Portable Network Graphic (png) image files, QuickTime File Format (QTFF) or QuickTime Movie (mov) video files, Audio Video Interleave (avi) video files, MPEG-4 video file format (mp4) video files, log files, text files, binary data files, and/or the like.

Sensor Assemblies

Figure 17:
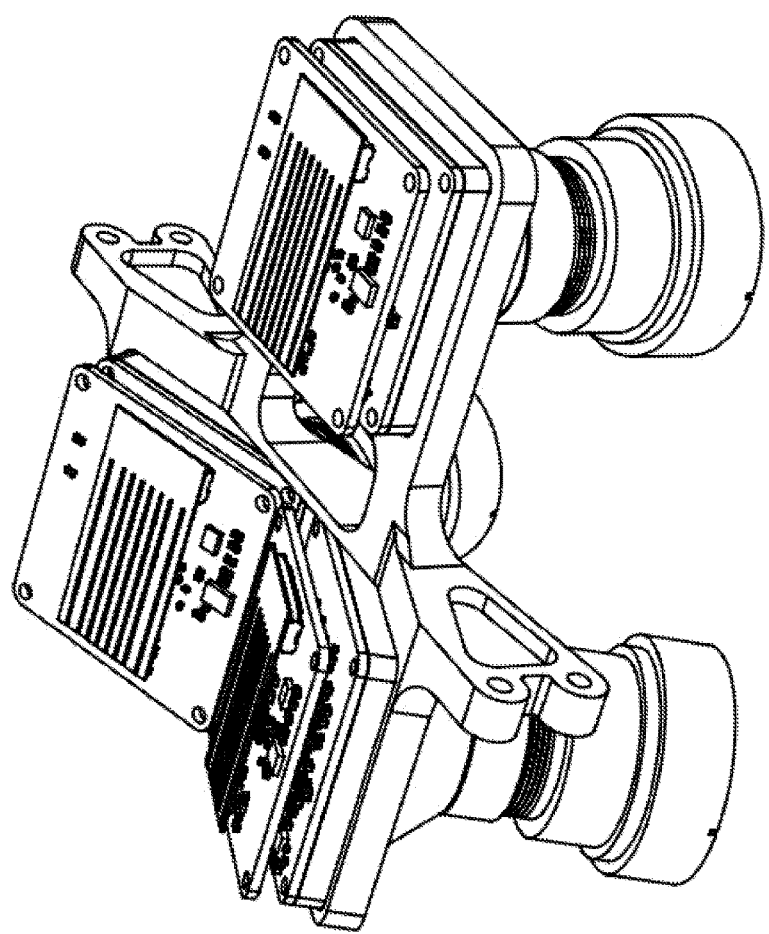
FIG. 17 illustrates a camera payload according to FIG. 1.
Figure 18:
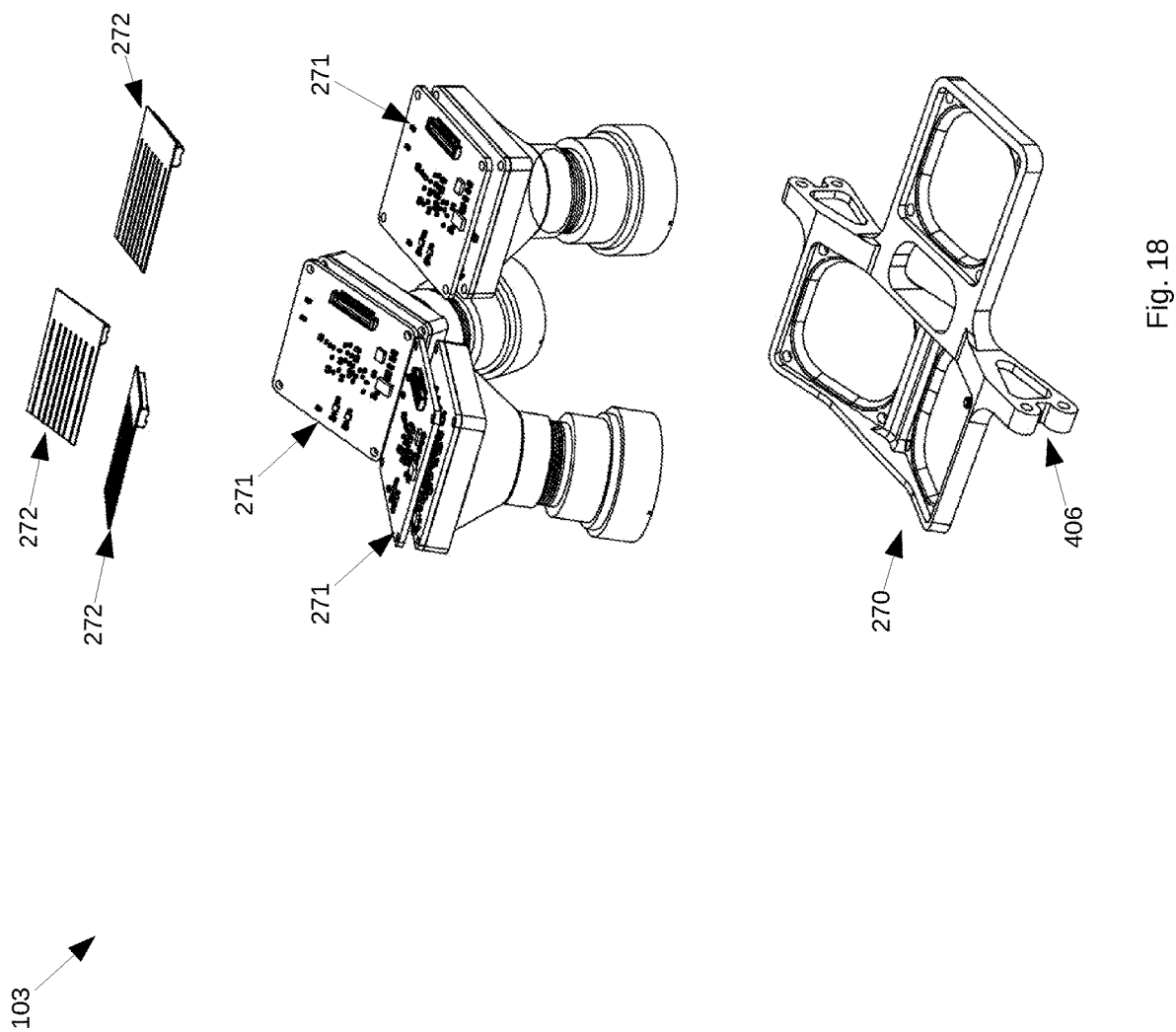
FIG. 18 illustrates a camera payload according to FIG. 1.

FIG. 17 and FIG. 18 illustrate the detailed construction of one potential embodiment of the sensor module assembly 103. The sensor module assembly 103 may include an/or carry one or more sensor modules 271 as illustrated in FIG. 18. In aspects, the sensor module assembly 103 may be implemented as an imaging sensor and lens, commonly known as a camera module.

The one or more sensor modules 271 may be carried and positioned by a sensor mounting structure 270. In aspects, the one or more sensor modules 271 may be fastened to the sensor mounting structure 270 by fasteners, such as screw fasteners, other mounting strategy, components, features, and/or the like. The sensor mounting structure 270 may also provide the mounting holes 406 to accept the fasteners 461 to mount the sensor module assembly 103 into the nose cone structure 104.

To provide for electrical and data connections to the sensor module assembly 103, sensor cables 272 may be attached to the sensor modules 271, and then also to the at least one computer module 102. Accordingly, the at least one computer module 102 may control and/or command the sensor modules 271 through the sensor cables 272, as well as collect, process and store data generated by the sensor modules 271. Any number of data protocols may be supported over the sensor cables 272 between the sensor module assembly 103 and the payload 100 to, such as serial data protocols, I2C data protocols, SPI data protocols, USB data protocols, MIPI data protocols, CSI data protocols, DSI data protocols, and so forth.

Figure 19:
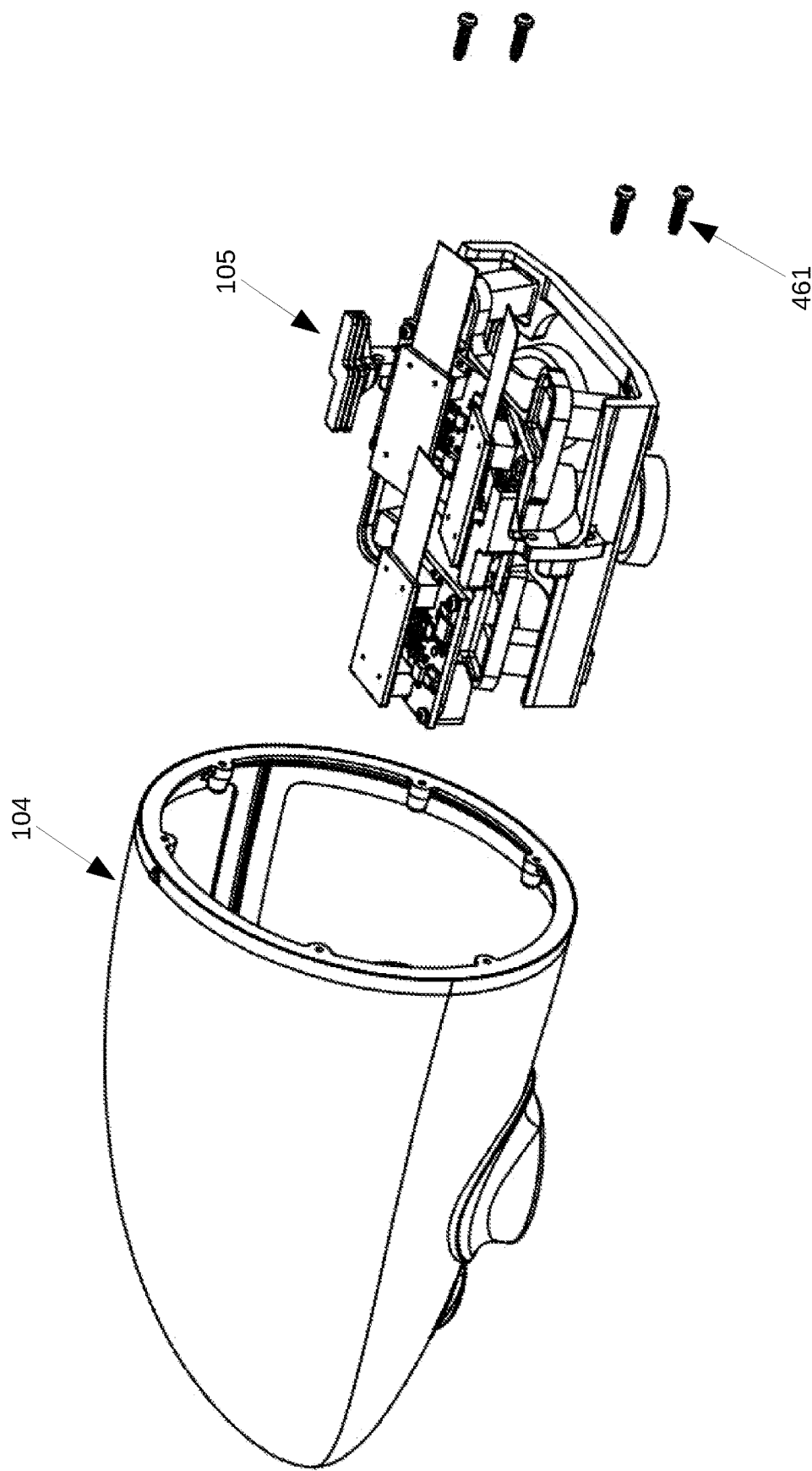
FIG. 19 illustrates a camera payload according to FIG. 1.
Figure 20:
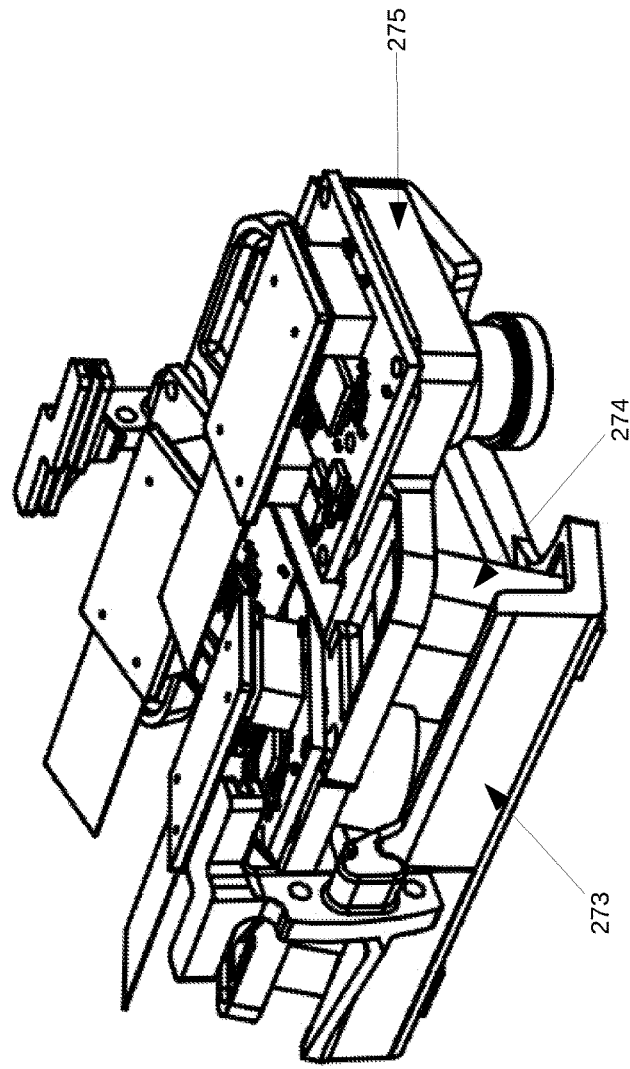
FIG. 20 illustrates a camera payload according to FIG. 1.

FIG. 19, FIG. 20 and FIG. 21 illustrate exemplary detailed construction of another potential embodiment the payload 100 utilizing a vibration isolated sensor module assembly 105. The vibration isolated sensor module assembly 105 may include a sensor carrying assembly 106 as illustrated in FIG. 21. The sensor carrying assembly 106 may include a sensor carrying structure 275, which carries sensor modules 271.

The sensor carrying structure 275 and/or the one or more sensor modules 271 may connect via sensor cables 272 to the at least one computer module 102. In this case, the sensor carrying structure 275 may provide for attachment to vibration isolating buffers 274. The vibration isolating buffers 274 may be composed of foam, springs and/or any other suitably compliant material such that sensor carrying assembly 106 is isolated from vibrations that may be generated by UAS 1010 and transmitted through the payload wall structure 235 and into the nose cone structure 104. The vibration isolating buffers 274 may mount onto a vibration mount tray 273, which further attaches to the nose cone structure 104 with the fasteners 461. Vibration isolation in this implemented structure and/or method can be vital to the proper operation of many types of sensors, especially and including rolling-shutter type imaging sensors.

Windows

Figure 22:
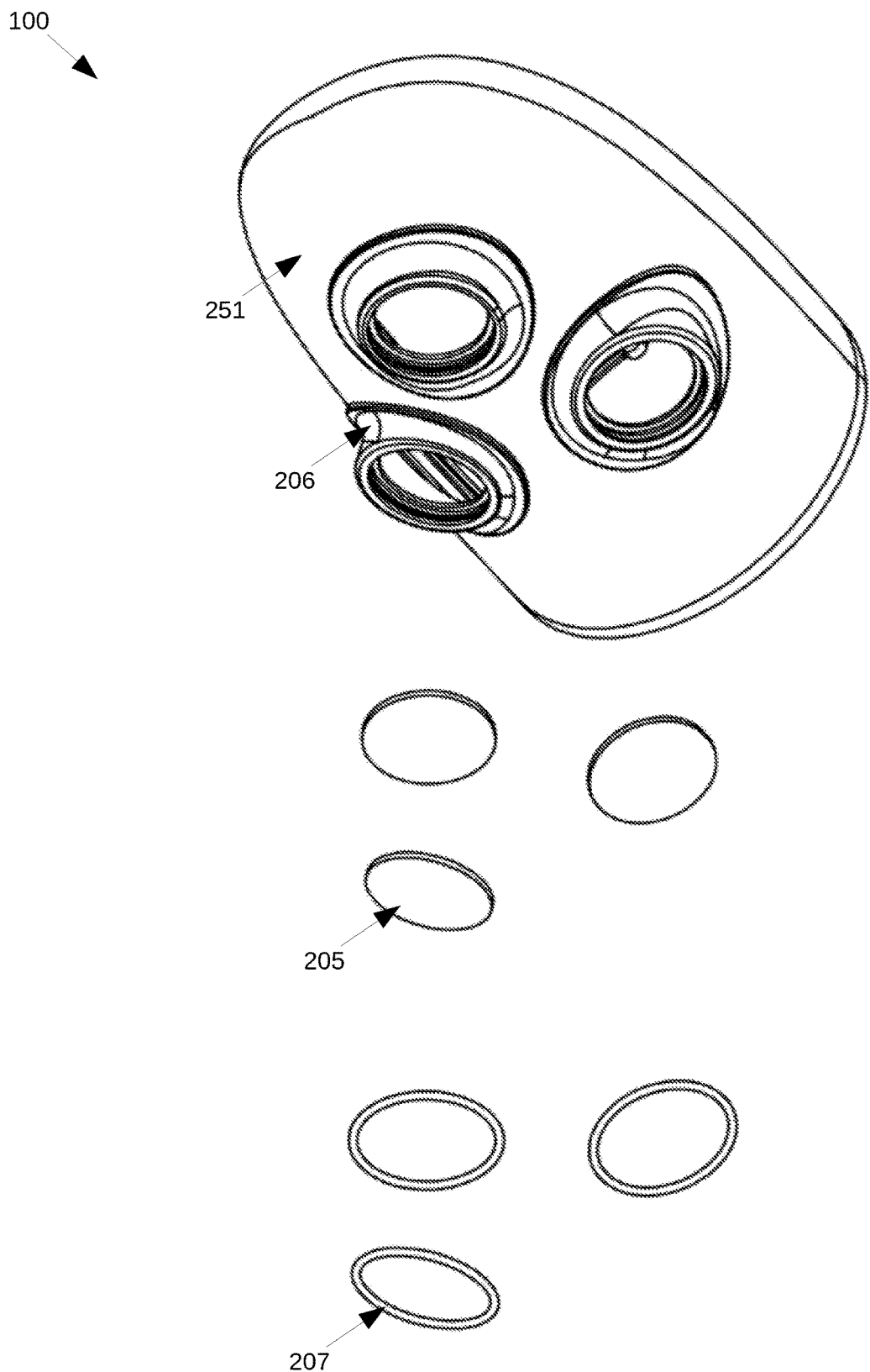
FIG. 22 illustrates a camera payload according to the disclosure.

As illustrated in FIG. 22, the payload 100 further may be configured to allow the windows 205 of the payload 100 to be removed, serviced, replaced, and/or the like. In the construction illustrated in FIG. 22, the windows 205 may be retained using the window sealing O-ring 207 which may be implemented as rubber O-rings. In this regard, the window sealing O-ring 207 may secure and seal the windows 205 into window holders 206. The windows 205 can be made of various transparent materials of different scratch resistance. Additionally, the windows 205 may be coated with optical treatments that filter for different types of light, polarizations, reflections, wavelengths, and/or the like. The windows 205 may also be configured to protect the lenses of the sensor module assembly 103 and other interior structures from intrusion by water, dust and other debris.

Camera Array Configurations

As illustrated in FIG. 23, FIG. 24, FIG. 25, FIG. 26, and FIG. 27, the payload 100 can be assembled with a different numbers of cameras implemented by the sensor module assembly 103. In particular, the aspects illustrated in FIG. 23, FIG. 24, FIG. 25, FIG. 26, and FIG. 27 may include any one or more aspects described herein in relation to FIGS. 1-22 and the associated aspects described in relation thereto.

In particular aspects, the cameras implemented by the aspects of FIG. 23, FIG. 24, FIG. 25, FIG. 26, and FIG. 27 can be of various sizes, can be arranged to individually point in various directions, and/or the like. FIG. 23, FIG. 24, FIG. 25, FIG. 26, and FIG. 27 are shown from a bottom view of the payload 100 in the case of primarily nadir-facing applications. However many other orientations and positions of the camera modules or sensor modules are contemplated and possible.

Figure 23:
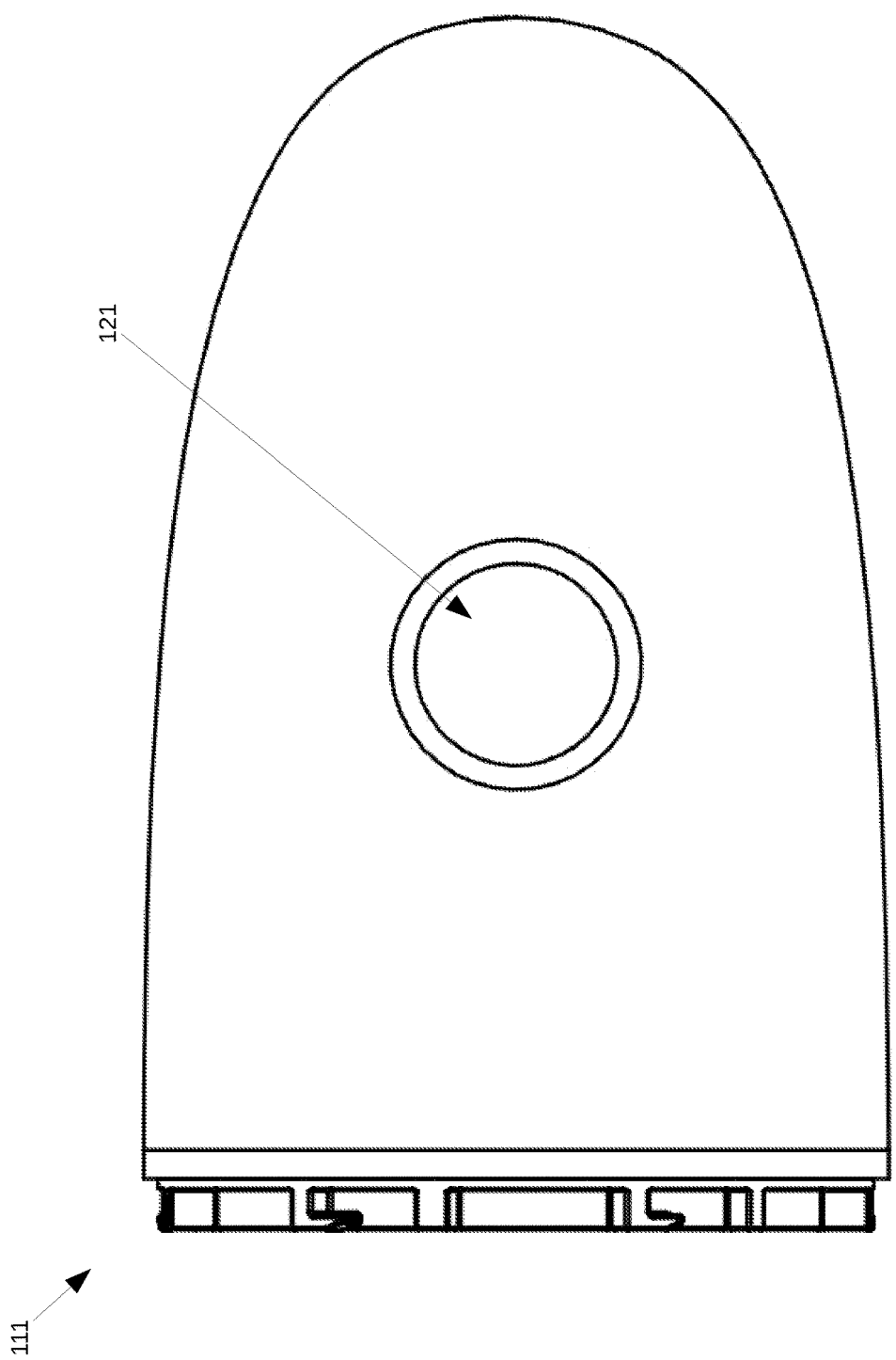
FIG. 23 illustrates a camera payload according to the disclosure.

In FIG. 23, an example of a configuration of a single-sensor payload 111 is shown to expose a single camera module and a single implementation of the window assemblies 121. Aspects of the FIG. 23 implementation may include other aspects as described herein.

Figure 24:
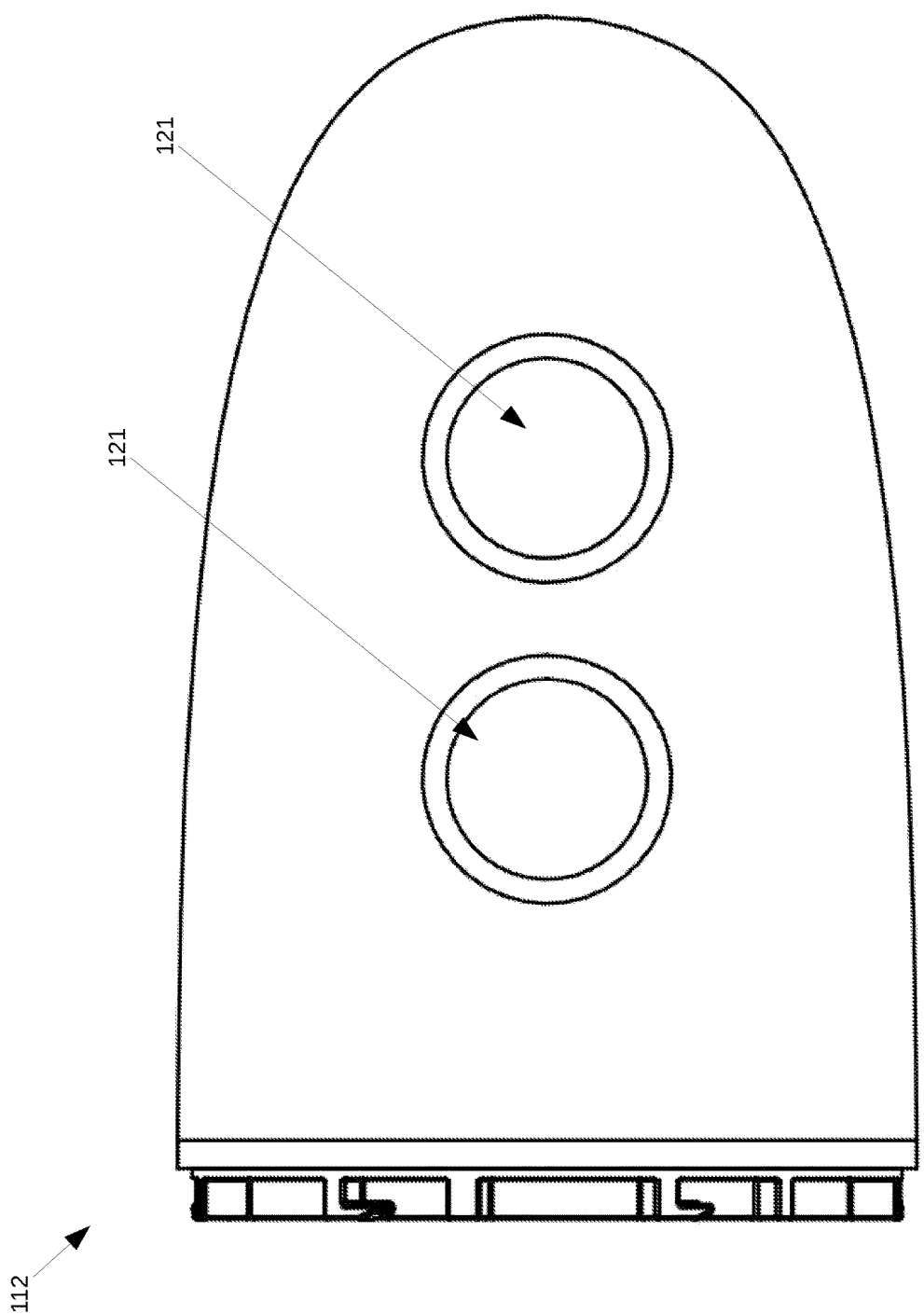
FIG. 24 illustrates a camera payload according to the disclosure.

In FIG. 24, an example of a configuration of a double-sensor payload 112 is shown to expose a two camera module and double window assemblies 121. Aspects of the FIG. 24 implementation may include other aspects as described herein.

Figure 25:
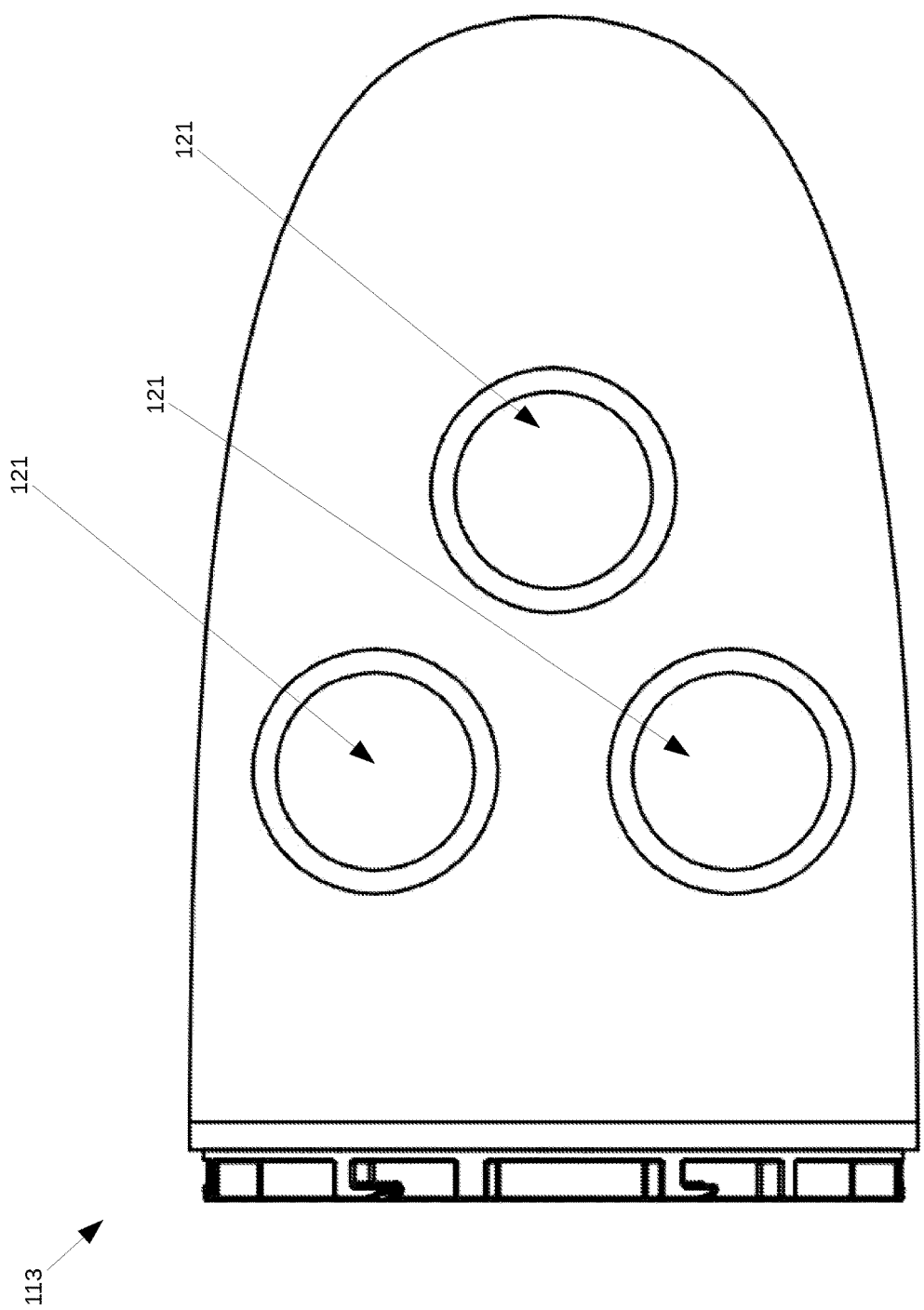
FIG. 25 illustrates a camera payload according to the disclosure.

In FIG. 25, an example of a configuration of a triple-sensor payload 113 is shown to expose a three camera module and three window assemblies 121. Aspects of the FIG. 25 implementation may include other aspects as described herein.

Figure 26:
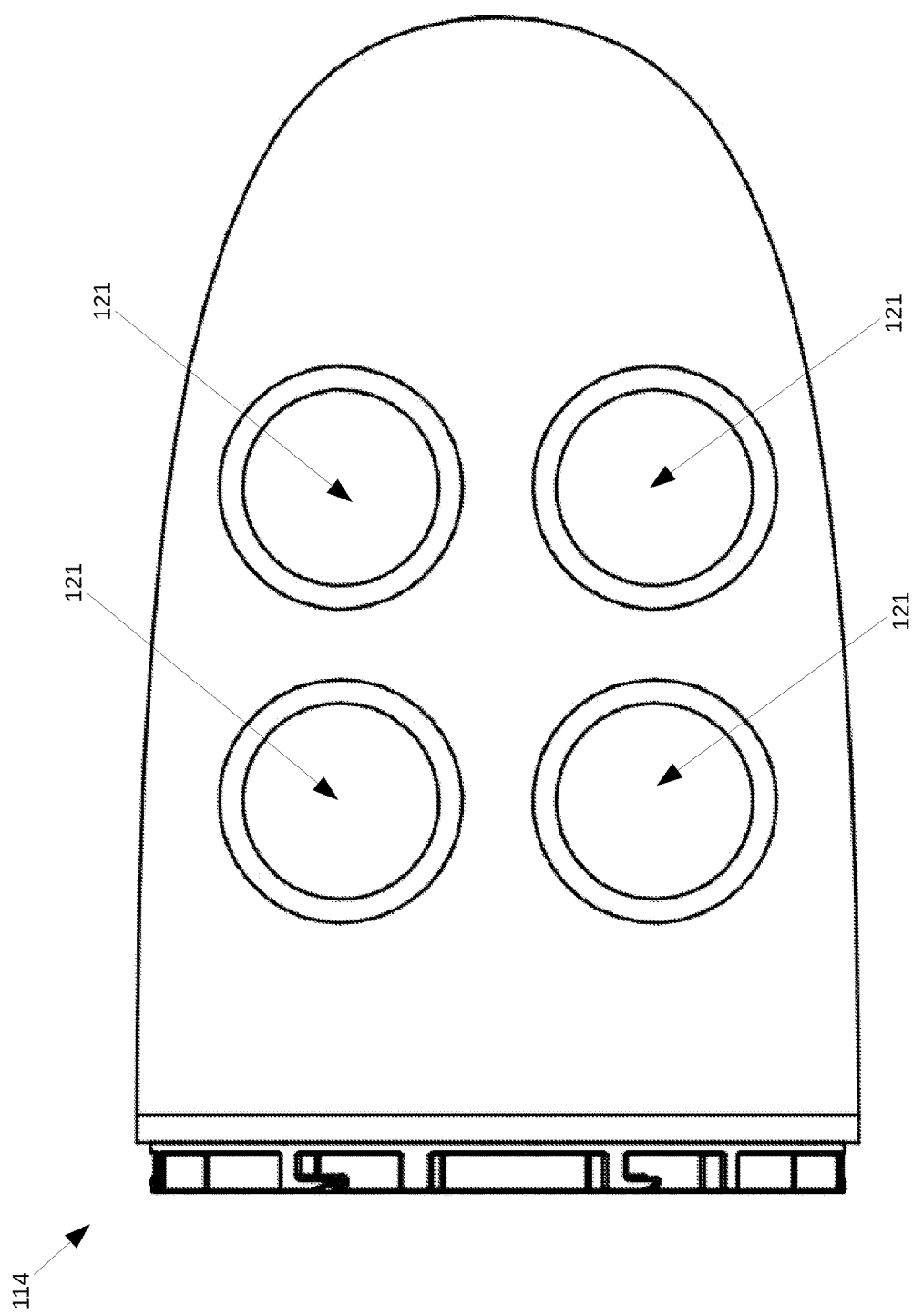
FIG. 26 illustrates a camera payload according to the disclosure.

In FIG. 26, an example of a configuration of a four-sensor payload 114 is shown to expose a four camera module and four window assemblies 121. Aspects of the FIG. 26 implementation may include other aspects as described herein.

Figure 27:
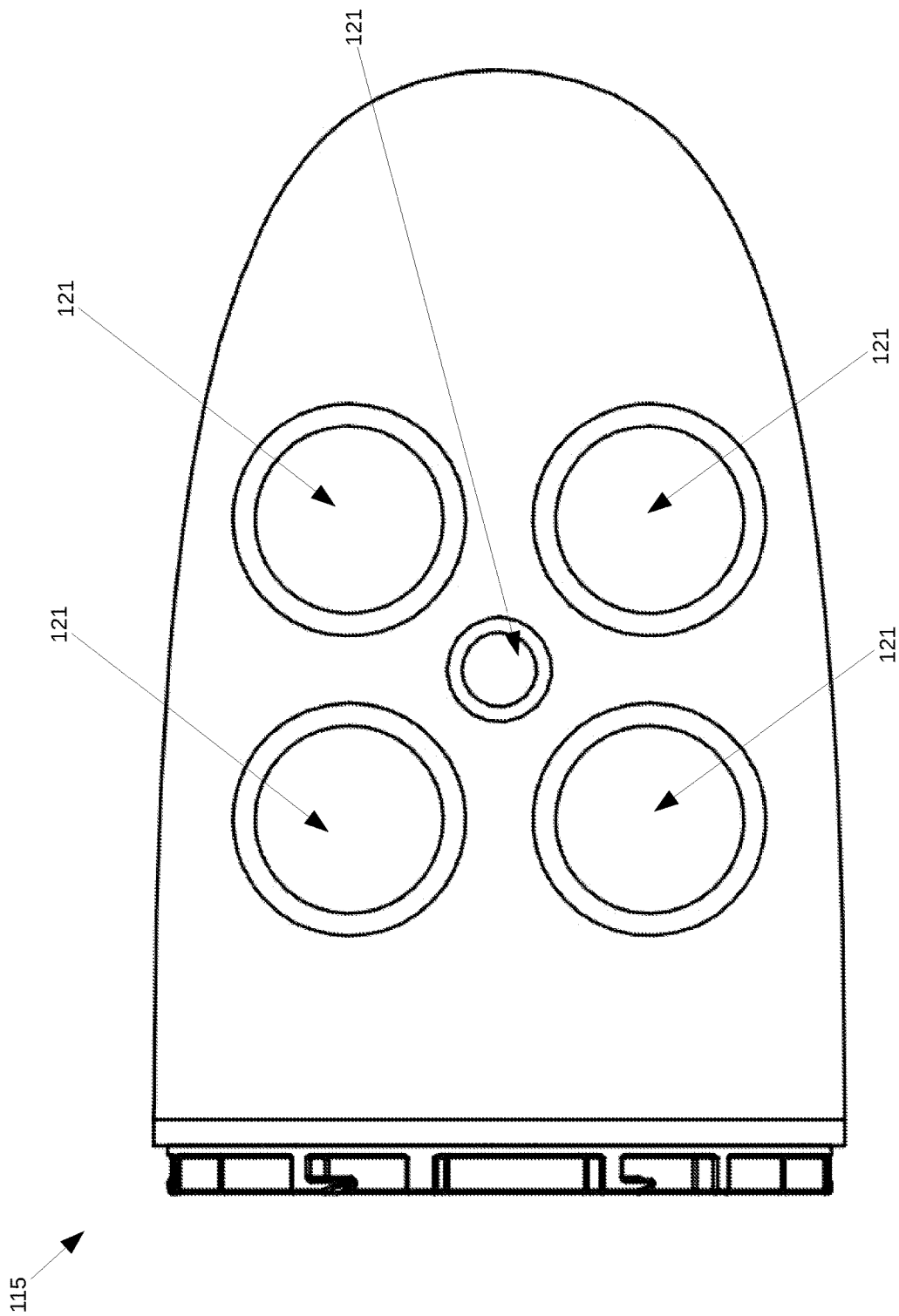
FIG. 27 illustrates a camera payload according to the disclosure.

In FIG. 27, an example of a configuration of a five-sensor payload 115 is shown to expose five sensor module and five window assemblies 121. Aspects of the FIG. 27 implementation may include other aspects as described herein.

Shown in FIG. 28, a particular configuration of this disclosure is that of a three-camera array. In aspects, the configuration illustrated in FIG. 28 is implemented where one of the cameras is configured and arranged to point straight down along the nadir of the aircraft (shown by line of sight indicator 501), one of the cameras is configured and arranged to point at an angle to the left of the aircraft (shown by line of sight indicator 502), and a third camera is configured and arranged to point to a similar angle to the right of the aircraft (shown by line of sight indicator 503).

This configuration illustrated in FIG. 28 allows the payload 100 to image a wide area, with a total cross-track field of view indicated angle 505. More specifically, the configuration illustrated in FIG. 28 provides an overlapping of the individual fields of view of the individual cameras. With the wide field of view and corresponding angles of the cameras as illustrated in FIG. 28, the payload 100 is configured such that it is possible to image the vertical faces of tall structures. In this regard, implementation of the payload 100 as illustrated in FIG. 28 operates such that the side cameras point at an angle to the ground as illustrated by the line of sight indicator 502 and the line of sight indicator 503. The implementation of the payload 100 as illustrated in FIG. 28 may be of particular use for aerial survey applications.

Sealing

The total sealing strategy of the payload 100 may be an important system consideration that is reiterated here. In the presented embodiment of the payload 100, there may be four general intrusion areas that are addressed by the design and configuration of the payload 100 to enable a fully water-sealed and dust-sealed embodiment.

The first sealing area of the payload 100 may include the overall casing of the nose cone structure 104, which as shown in FIG. 12, may be provided by non-porous implementations of the composite skin 251. In this regard, the composite skin 251 may be sealed via bonding to the internal structure 252 with an impermeable bonding material.

The second sealing area is addressed by aspects of the disclosed implementation of the payload 100 may be an interface between the payload wall 101 and the nose cone structure 104. In this regard, as shown in FIG. 8, this aspect may be addressed by implementations of the payload 100 using a non-porous bonding material. For example, the non-porous bonding material may be implemented utilizing room-temperature vulcanizing rubber, to close any small gap that might occur between a back face of nose cone structure 104 and an inside face of payload wall 101. In particular aspects, to close any small gap that might occur between the back face of nose cone structure 104, such as a back ring of the internal structure 252, and the inside face of payload wall 101, such as the sealing lip provided by lip of the alignment walls 244.

The third sealing area is addressed by implementations of the payload 100 include the holding of the windows 205 in front of the camera lenses. In this regard, as shown in FIG. 22, the third sealing area may be addressed by an implementation of non-porous bonding of the window holder 206 to the composite skin 251.

Additionally, the third sealing area may be addressed by using the window sealing O-ring 207 to seal the window 205 against the window holder 206. The window sealing O-ring 207 may be further augmented using a manufacturing practice of greasing with a suitable grease, such as silicone grease, a suitable adhesive, such as room temperature vulcanizing rubber, and/or the like.

The fourth sealing area addressed by the implementations of the payload 100 may include configuring open interfaces at the back of the payload wall 101. For example, data cards, such as the removable data storage card 210, and electrical connectors, such as the payload connector 211 as shown in FIG. 5, may be addressed by using the sealing O-ring 242 that is retained in the groove 243 as shown in FIG. 11. In this regard, the sealing O-ring 242 that is retained in the O-ring groove 243 may be configured and structured to seal against the front fuselage wall and/or the payload interface 1011 of a UAS 1010 and/or aircraft as illustrated in FIG. 7. In this regard, the sealing O-ring 242 that is retained in the O-ring groove 243 may be augmented with grease, adhesive, and/or the like. In this regard, the sealing O-ring 242 that is retained in the O-ring groove 243 may be the only seal that is routinely openable, as it only seals when the payload 100 is mounted onto the UAS 1010. However this is acceptable in practice as there is not a practical need to seal all of the components the payload 100 when it is not being flown on an UAS.

Accordingly, the disclosed device may be configured as a payload for Unmanned Aircraft Systems (UAS) and/or an aircraft. The payload may include a single camera array or a multi-camera array (camera), onboard computer, and a memory card housed inside a shell of the payload with one or more watertight window seals. The camera may or may not be vibration isolated to reduce rolling shutter artifacts in an image generated by the camera. The onboard computer may be configured to reject heat through a skin of the shell. By using multiple cameras, more image data may be collected from each flight.

The following are a number of nonlimiting EXAMPLES of aspects of the disclosure. One EXAMPLE includes: EXAMPLE 1. A camera payload configured for attachment to an unmanned aerial system with a payload interface, the camera payload includes: a payload interface includes a configuration that is structured and arranged to provide tool-free mechanical retention, electrical connections for power, and electrical connections for data; at least one camera mounted in the camera payload; at least one composite skin and at least one internal structure; at least one sealable and removable camera window retained on an outside of the camera payload; and at least one computer arranged within the camera payload, where excess heat generated by the at least one computer is disposed of through a heat transfer surface integrated into the composite skins of the camera payload.

The above-noted EXAMPLE may further include any one or a combination of more than one of the following EXAMPLES: 2. The camera payload of any EXAMPLE herein, includes a removable data storage arranged in a payload wall interface. 3. The camera payload of any EXAMPLE herein, where the camera payload attaches to an unmanned aerial system at a front of an aircraft by the payload interface. 4. The camera payload of any EXAMPLE herein, where the camera payload is configured and/or constructed to reduce penetration by water and/or small particles. 5. The camera payload of any EXAMPLE herein, includes a bonded composite structure, where the bonded composite structure includes the at least one composite skin; where the at least one composite skin includes one or more thin-wall composite skins constructed of bonded fabric, metal or synthetic material; and where the bonded composite structure further includes the at least one internal structure configured to hold the one or more thin-wall composite skins. 6. The camera payload of any EXAMPLE herein, includes a heat pipe, where heat from the at least one computer is transported to a payload wall through the heat pipe. 7. The camera payload of any EXAMPLE herein, where the heat pipe is mounted to the at least one computer with a heat-transfer component. 8. The camera payload of any EXAMPLE herein, includes a compliant mounting supporting the at least one camera, where the compliant mounting is configured to isolate the at least one camera and reduce vibration of the at least one camera. 9. The camera payload of any EXAMPLE herein, includes at least one sealing window holding structure, where the at least one sealing window holding structure is integrated and/or attached to an outside of a payload skin and/or the at least one composite skin. 10. The camera payload of any EXAMPLE herein, where the at least one sealable and removable camera window is retained by at least one compliant sealing ring; and where the at least one compliant sealing ring includes at least one O-ring. 11. The camera payload of any EXAMPLE herein, where the at least one camera includes at least one color camera. 12. The camera payload of any EXAMPLE herein, where the at least one camera includes at least one color camera of fixed focal length and at least one thermal camera of fixed focal length. 13. The camera payload of any EXAMPLE herein, where the at least one camera is fitted with at least one filter includes at least one of the following: a polarization filter and/or a light wavelength filter. 14. The camera payload of any EXAMPLE herein, where the at least one sealable and removable camera window includes a coating configured to implement at least one of the following: a polarization filter and/or a light wavelength filter.

One EXAMPLE includes: EXAMPLE 15. A process of implementing a camera payload configured for attachment to an unmanned aerial system with a payload interface, the process of implementing a camera payload includes: configuring and arranging a payload interface to provide tool-free mechanical retention, electrical connections for power, and electrical connections for data; providing at least one camera mounted in the camera payload; implementing at least one composite skin and at least one internal structure; implementing at least one sealable and removable camera window retained on an outside of the camera payload; and implementing at least one computer arranged within the camera payload, where excess heat generated by the at least one computer is disposed of through a heat transfer surface integrated into the composite skins of the camera payload.

The above-noted EXAMPLE may further include any one or a combination of more than one of the following EXAMPLES: 16. The process of implementing a camera payload of any EXAMPLE herein, includes a removable data storage arranged in a payload wall interface. 17. The process of implementing a camera payload of any EXAMPLE herein, where the camera payload attaches to an unmanned aerial system at a front of an aircraft by the payload interface. 18. The process of implementing a camera payload of any EXAMPLE herein, where the camera payload is configured and/or constructed to reduce penetration by water and/or small particles. 19. The process of implementing a camera payload of any EXAMPLE herein, includes a bonded composite structure, where the bonded composite structure includes the at least one composite skin; where the at least one composite skin includes one or more thin-wall composite skins constructed of bonded fabric, metal or synthetic material; and where the bonded composite structure further includes the at least one internal structure configured to hold the one or more thin-wall composite skins. 20. The process of implementing a camera payload of any EXAMPLE herein, includes a heat pipe, where heat from the at least one computer is transported to a payload wall through the heat pipe. 21. The process of implementing a camera payload of any EXAMPLE herein, where the heat pipe is mounted to the at least one computer with a heat-transfer component. 22. The process of implementing a camera payload of any EXAMPLE herein, includes a compliant mounting supporting the at least one camera, where the compliant mounting is configured to isolate the at least one camera and reduce vibration of the at least one camera. 23. The process of implementing a camera payload of any EXAMPLE herein, includes at least one sealing window holding structure, where the at least one sealing window holding structure is integrated and/or attached to an outside of a payload skin and/or the at least one composite skin. 24. The process of implementing a camera payload of any EXAMPLE herein, where the at least one sealable and removable camera window is retained by at least one compliant sealing ring; and where the at least one compliant sealing ring includes at least one O-ring. 25. The process of implementing a camera payload of any EXAMPLE herein, where the at least one camera includes at least one color camera. 26. The process of implementing a camera payload of any EXAMPLE herein, where the at least one camera includes at least one color camera of fixed focal length and at least one thermal camera of fixed focal length. 27. The process of implementing a camera payload of any EXAMPLE herein, where the at least one camera is fitted with at least one filter includes at least one of the following: a polarization filter and/or a light wavelength filter. 28. The process of implementing a camera payload of any EXAMPLE herein, where the at least one sealable and removable camera window includes a coating configured to implement at least one of the following: a polarization filter and/or a light wavelength filter.

One EXAMPLE includes: EXAMPLE 29. A lightweight camera payload configured for attachment to an unmanned aerial system with a payload interface that includes: a configuration that is structured and arranged to provide: tool-free mechanical retention; electrical connections for power; and electrical connections for data; one, two, three, or more at least one camera mounted in the payload; a construction using composite skins and internal structure; sealable and removable camera windows retained on the outside of the payload; and at least one computer, where excess heat generated by one or more of the computers is disposed of through a heat transfer surface integrated into the skin of the payload.

The above-noted EXAMPLE may further include any one or a combination of more than one of the following EXAMPLES: 30. The lightweight camera payload of any EXAMPLE herein, where removable data storage (cfexpress, microsd, sd) is provided at a payload wall interface. 31. The lightweight camera payload of any EXAMPLE herein, where the payload attaches to an unmanned aerial system at a front of an aircraft. 32. The lightweight camera payload of any EXAMPLE herein, where the payload is constructed to be impervious to penetration by water and/or small particles like sand or dust. 33. The lightweight camera payload of any EXAMPLE herein, where the payload is constructed of a bonded composite structure, includes: one or more thin-wall composite skins, constructed of bonded fabric, metal or other material one or more internal composing structures that hold the skins. 34. The lightweight camera payload of any EXAMPLE herein, where rejected heat is transported to a payload wall through a heat pipe or otherwise heat-conducting conduit. 35. The lightweight camera payload of any EXAMPLE herein, where the heat pipe is mounted to the computer with a dedicated heat-transfer component. 36. The lightweight camera payload of any EXAMPLE herein, where the at least one camera are further isolated from vibration with a compliant mounting. 37. The lightweight camera payload of any EXAMPLE herein, where sealing window holding structures are integrated or attached to the outside of a payload skin. 38. The lightweight camera payload of any EXAMPLE herein, where the windows are retained by use of O-ring, or similar rubber-like compliant sealing rings. 39. The lightweight camera payload of any EXAMPLE herein, includes sensors that include a single color camera. 40. The lightweight camera payload of any EXAMPLE herein, includes sensors that include one color camera of fixed focal length and one thermal camera of fixed focal length. 41. The lightweight camera payload of any EXAMPLE herein, includes sensors that are fitted with various filters for polarization or wavelength of light. 42. The lightweight camera payload of any EXAMPLE herein, where the windows are treated with coatings that filter for various polarizations or wavelengths of light.

This application is related to U.S. Provisional Application No. 63/185,381 filed on May 7, 2021, which is hereby incorporated by reference in its entirety for all purposes as if fully set forth herein. Additionally, this application is related to U.S. Non-Provisional application Ser. No. 17/738,100 filed May 6, 2022, entitled LIGHTWEIGHT STABILIZED GIMBAL CAMERA PAYLOAD FOR SMALL AERIAL VEHICLES, which is hereby incorporated by reference in its entirety for all purposes as if fully set forth herein.

The many features and advantages of the disclosure are apparent from the detailed specification, and, thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. A camera payload configured for attachment to an unmanned aerial system with a payload interface, the camera payload comprising:
   a payload interface comprising a configuration that is structured and arranged to provide tool-free mechanical retention, electrical connections for power, and electrical connections for data;
   at least one camera mounted in the camera payload;
   at least one composite skin and at least one internal structure;
   at least one sealable and removable camera window retained on an outside of the camera payload;
   a bonded composite structure; and
   at least one computer arranged within the camera payload,
   wherein the bonded composite structure comprises the at least one composite skin;
   wherein the at least one composite skin comprises one or more thin-wall composite skins constructed of bonded fabric, metal or synthetic material;
   wherein the bonded composite structure further comprises the at least one internal structure configured to hold the one or more thin-wall composite skins; and
   wherein excess heat generated by the at least one computer is disposed of through a heat transfer surface integrated into the composite skins of the camera payload.

2. A camera payload configured for attachment to an unmanned aerial system with a payload interface, the camera payload comprising:
   a payload interface comprising a configuration that is structured and arranged to provide tool-free mechanical retention, electrical connections for power, and electrical connections for data;
   at least one camera mounted in the camera payload;
   at least one composite skin and at least one internal structure;
   at least one sealable and removable camera window retained on an outside of the camera payload;
   at least one computer arranged within the camera payload; and
   a removable data storage arranged in a payload wall interface,
   wherein excess heat generated by the at least one computer is disposed of through a heat transfer surface integrated into the composite skins of the camera payload.

3. The camera payload of claim 1, wherein the camera payload attaches to an unmanned aerial system at a front of an aircraft by the payload interface.

4. The camera payload of claim 1, wherein the camera payload is configured and/or constructed to reduce penetration by water and/or small particles.

5. The camera payload of claim 2, further comprising a bonded composite structure,
   wherein the bonded composite structure comprises the at least one composite skin;
   wherein the at least one composite skin comprises one or more thin-wall composite skins constructed of bonded fabric, metal or synthetic material; and
   wherein the bonded composite structure further comprises the at least one internal structure configured to hold the one or more thin-wall composite skins.

6. The camera payload of claim 1, further comprising a heat pipe,
   wherein heat from the at least one computer is transported to a payload wall through the heat pipe.

7. The camera payload of claim 6, wherein the heat pipe is mounted to the at least one computer with a heat-transfer component.

8. The camera payload of claim 1, further comprising a compliant mounting supporting the at least one camera,
   wherein the compliant mounting is configured to isolate the at least one camera and reduce vibration of the at least one camera.

9. The camera payload of claim 1, further comprising at least one sealing window holding structure, wherein the at least one sealing window holding structure is integrated and/or attached to an outside of a payload skin and/or the at least one composite skin.

10. The camera payload of claim 1,
    wherein the at least one sealable and removable camera window is retained by at least one compliant sealing ring; and
    wherein the at least one compliant sealing ring comprises at least one O-ring.

11. The camera payload of claim 1, wherein the at least one camera comprises at least one color camera.

12. The camera payload of claim 1, wherein the at least one camera comprises at least one color camera of fixed focal length and at least one thermal camera of fixed focal length.

13. The camera payload of claim 1, wherein the at least one camera is fitted with at least one filter comprising at least one of the following: a polarization filter and/or a light wavelength filter.

14. The camera payload of claim 1, wherein the at least one sealable and removable camera window comprises a coating configured to implement at least one of the following: a polarization filter and/or a light wavelength filter.

15. A process of implementing a camera payload configured for attachment to an unmanned aerial system with a payload interface, the process of implementing a camera payload comprising:

configuring and arranging a payload interface to provide tool-free mechanical retention, electrical connections for power, and electrical connections for data;

providing at least one camera mounted in the camera payload;

implementing at least one composite skin and at least one internal structure;

implementing at least one sealable and removable camera window retained on an outside of the camera payload;

providing a bonded composite structure; and implementing at least one computer arranged within the camera payload, wherein excess heat generated by the at least one computer is disposed of through a heat transfer surface integrated into the composite skins of the camera payload;

wherein the bonded composite structure comprises the at least one composite skin;

wherein the at least one composite skin comprises one or more thin-wall composite skins constructed of bonded fabric, metal or synthetic material; and wherein the bonded composite structure further comprises the at least one internal structure configured to hold the one or more thin-wall composite skins.

16. The process of implementing a camera payload of claim 15, further comprising a removable data storage arranged in a payload wall interface.

17. The process of implementing a camera payload of claim 15, wherein the camera payload attaches to an unmanned aerial system at a front of an aircraft by the payload interface.

18. The process of implementing a camera payload of claim 15, wherein the camera payload is configured and/or constructed to reduce penetration by water and/or small particles.

19. The process of implementing a camera payload of claim 15, further comprising a heat pipe, wherein heat from the at least one computer is transported to a payload wall through the heat pipe.

* * * * *